(12) United States Patent
Sueoka et al.

(10) Patent No.: US 10,605,193 B2
(45) Date of Patent: Mar. 31, 2020

(54) CONTROL SYSTEM FOR COMPRESSION-IGNITION ENGINE

(71) Applicant: Mazda Motor Corporation, Aki-gun, Hiroshima (JP)

(72) Inventors: Masanari Sueoka, Hiroshima (JP); Takuya Ohura, Hiroshima (JP); Tatsuhiro Tokunaga, Aki-gun (JP); Keiji Maruyama, Hiroshima (JP); Tomohiro Nishida, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/189,910

(22) Filed: Nov. 13, 2018

(65) Prior Publication Data

US 2019/0186405 A1    Jun. 20, 2019

(30) Foreign Application Priority Data

Dec. 15, 2017    (JP) .................... 2017-240536

(51) Int. Cl.
*B60T 7/12* (2006.01)
*F02D 41/40* (2006.01)
(Continued)

(52) U.S. Cl.
CPC .............. *F02D 41/401* (2013.01); *F02B 1/10* (2013.01); *F02B 1/14* (2013.01); *F02B 3/02* (2013.01);
(Continued)

(58) Field of Classification Search
CPC .......... F02D 1/16; F02D 41/061; F02D 41/34; F02D 41/345; F02D 41/401;
(Continued)

(56) References Cited

U.S. PATENT DOCUMENTS 6,390,057 B2 * 5/2002 Yoshizawa ............... F02B 1/12
                                                              123/295
7,996,147 B2 * 8/2011 Gokhale ................. F02D 35/023
                                                              60/602
(Continued)

FOREIGN PATENT DOCUMENTS

JP    2003049691 A    2/2003
JP    2009108778 A    5/2009

OTHER PUBLICATIONS

European Patent Office, Extended European Search Report Issued in Application No. 18209066.2, dated May 23, 2019, Germany, 44 pages.
(Continued)

*Primary Examiner* — John Kwon
(74) *Attorney, Agent, or Firm* — Alleman Hall Creasman & Tuttle LLP

(57) ABSTRACT

A control system for a compression-ignition engine is provided, which includes an engine having a combustion chamber, an injector configured to supply fuel into the combustion chamber, a spark plug, a swirl valve provided to an intake passage of the engine, and a controller connected to the injector, the spark plug and the swirl valve to control them. The controller includes a processor configured to execute a swirl adjusting module to adjust an opening of the swirl valve to generate a swirl flow inside the combustion chamber, a fuel injection timing controlling module to control a fuel injection timing and control the injector to retard the fuel injection timing as an engine speed increases, and a combustion controlling module to control the spark plug to ignite at a given ignition timing after the swirl generation and the fuel injection, so that partial compression-ignition combustion is performed.

8 Claims, 18 Drawing Sheets

(51) Int. Cl.
| | |
|---|---|
| *F02D 41/00* | (2006.01) |
| *F02B 1/14* | (2006.01) |
| *F02B 1/10* | (2006.01) |
| *F02D 13/02* | (2006.01) |
| *F02D 41/30* | (2006.01) |
| *F02B 5/00* | (2006.01) |
| *F02B 31/06* | (2006.01) |
| *F02B 3/02* | (2006.01) |
| *F02M 26/33* | (2016.01) |

(52) U.S. Cl.
CPC ............... *F02B 5/00* (2013.01); *F02B 31/06* (2013.01); *F02D 13/0261* (2013.01); *F02D 41/0057* (2013.01); *F02D 41/0077* (2013.01); *F02D 41/3041* (2013.01); *F02D 41/402* (2013.01); *F02D 41/006* (2013.01); *F02D 41/0065* (2013.01); *F02D 41/3047* (2013.01); *F02D 2041/0015* (2013.01); *F02M 26/33* (2016.02)

(58) Field of Classification Search
CPC ..... F02D 2200/0618; F02D 2200/0602; F02D 37/02; F02M 41/1411; F02M 37/04; F02P 5/00
USPC ................... 701/101, 105; 123/495, 406.11
See application file for complete search history.

(56) References Cited

U.S. PATENT DOCUMENTS

| | | | |
|---|---|---|---|
| 8,977,469 B2* | 3/2015 | Gokhale | ................. F02D 35/02 123/575 |
| 9,228,506 B2* | 1/2016 | Gokhale | ............... F02D 41/401 |
| 2001/0006054 A1* | 7/2001 | Yoshizawa | ................ F02B 1/12 123/295 |
| 2002/0059914 A1 | 5/2002 | Yamaguchi et al. | |

OTHER PUBLICATIONS

Benajes, J et al., "Performance and engine-out emissions evaluation of the double injection strategy applied to the gasoline partially premixed compression ignition spark assisted combustion concept," Journal of Applied Energy, Aug. 23, 2014, 12 pages.

* cited by examiner

CONTROL SYSTEM FOR COMPRESSION-IGNITION ENGINE

TECHNICAL FIELD

The present disclosure relates to a control system for a compression-ignition engine, which performs partial compression-ignition combustion in which a mixture gas within a cylinder is partially combusted by spark ignition (SI combustion) and then the remaining mixture gas within the cylinder is combusted by self-ignition (CI (compression ignition) combustion).

BACKGROUND OF THE DISCLOSURE

Recently, Homogeneous-Charge Compression Ignition (HCCI) combustion in which gasoline fuel mixed with air is combusted by self-ignition inside a sufficiently compressed combustion chamber has attracted attention. The HCCI combustion is a mode in which the mixture gas combusts at a plurality of positions simultaneously, and thus has a faster combustion speed of the mixture gas than in SI combustion (spark ignition combustion) which is adopted for general gasoline engines. Therefore, the HCCI combustion is said to be significantly advantageous in terms of thermal efficiency. However, the HCCI combustion has issues such as a combustion start timing of the mixture gas (a timing at which the mixture gas self-ignites) greatly varying due to external factors (e.g., atmospheric temperature) and control during a transient operation in which an engine load sharply changes being difficult.

Therefore, instead of combusting all of the mixture gas by self-ignition, it is proposed to combust a portion of the mixture gas by spark ignition using a spark plug. That is, after forcibly combusting a portion of the mixture gas through flame propagation caused by spark ignition (SI combustion), the remaining mixture gas is combusted by self-ignition (CI combustion). Hereinafter, such combustion is referred to as "partial compression-ignition combustion."

For example, JP2009-108778A discloses an engine adopting a similar concept to the partial compression-ignition combustion. This engine causes flame propagation combustion by spark-igniting stratified mixture gas which is formed around a spark plug by a supplementary fuel injection, and then performs a main fuel injection inside a combustion chamber warmed up by an effect of the flame propagation combustion, so as to combust the fuel injected in the main fuel injection through self-ignition.

Although the engine of JP2009-108778A can stimulate CI combustion by the spark ignition using the spark plug, a state of a flame core formed immediately after the spark ignition is considered to vary to some extent due to an environment of the combustion chamber. For example, when an engine speed is high, since a moving speed of a piston is high, the combustion chamber after the spark ignition rapidly expands to cause insufficient growth of the flame core. When the growth of the flame core is insufficient, a start timing of the CI combustion may greatly deviate from a target timing and the combustion may become unstable.

SUMMARY OF THE DISCLOSURE

The present disclosure is made in view of the above situations and aims to provide a control system for a compression-ignition engine, which secures high combustion stability regardless of an engine speed.

In order to solve the above issue, according to one aspect of the present disclosure, a control system for a compression-ignition engine is provided. The device includes an engine having a combustion chamber formed by a cylinder, a piston, and a cylinder head, an injector attached to the engine and configured to supply fuel into the combustion chamber, a spark plug disposed to be oriented into the combustion chamber, a swirl valve provided to an intake passage of the engine, and a controller connected to the injector, the spark plug, and the swirl valve, and configured to output a control signal to the injector, the spark plug, and the swirl valve, respectively. The controller includes a processor configured to execute a swirl adjusting module to adjust an opening of the swirl valve to generate a swirl flow inside the combustion chamber, a fuel injection timing controlling module to control a timing of the fuel injection by the injector, the fuel injection timing controlling module outputting a control instruction to the injector to retard the fuel injection timing as an engine speed increases, and a combustion controlling module to output an ignition instruction to the spark plug so as to ignite at a given ignition timing after the swirl generation by the swirl adjusting module and the fuel injection by the fuel injection timing controlling module, so that partial compression-ignition combustion in which the mixture gas combusts by flame propagation and then combusts by compression ignition is performed at the given ignition timing.

According to another aspect of the present disclosure, a control system for a compression-ignition engine is provided, the engine including an injector configured to supply fuel into a combustion chamber and a spark plug configured to ignite a mixture gas containing fuel supplied from the injector and air, the engine performing partial compression-ignition combustion including spark ignition (SI) combustion performed by combusting a portion of the mixture gas through spark ignition by the spark plug, followed by compression ignition (CI) combustion performed by causing the remaining mixture gas to self-ignite. The control system includes a swirl mechanism configured to generate a swirl flow, and a processor configured to control, during the partial compression-ignition combustion, the swirl mechanism to generate the swirl flow and the injector to retard a timing of the fuel injection into the combustion chamber as the engine speed increases.

According to this configuration, during the partial compression-ignition combustion, since the timing of the fuel injection into the combustion chamber is retarded when the engine speed is high compared to when it is low, the mixture gas having a high fuel concentration is formed when the engine speed is high, in a part of the combustion chamber near a compression top dead center where the ignition is performed. Thus, even under a condition where the engine speed is high and a rate of an expansion inside the combustion chamber after the spark ignition is high (as a result, the flame core is difficult to grow), the growth of the flame core is stimulated so that the SI combustion progresses stably and the subsequent CI combustion is surely performed, which avoids the start timing of the CI combustion greatly varying between cycles. As described above, according to this configuration, regardless of the engine speed being high or low, the stable partial compression-ignition combustion is achieved.

Here, the timing when the fuel is injected is a completion timing of the injection of 50% amount of the fuel into the combustion chamber in one cycle.

During the partial compression-ignition combustion in which the swirl flow is generated and the fuel injection timing is retarded as the engine speed increases, the fuel injection timing controlling module may cause the injector to perform a pre-injection in which a given amount of fuel is injected into the combustion chamber and a post-injection in which fuel is injected into the combustion chamber after the pre-injection and control the injector to retard the start timing of the pre-injection as the engine speed increases.

During the partial compression-ignition combustion in which the swirl flow is generated and the fuel injection timing is retarded as the engine speed increases, the fuel injection timing controlling module may control the injector to increase a ratio of an injection amount of the post-injection to a total amount of fuel to be injected into the combustion chamber in one cycle as the engine speed increases and to advance the start timing of the post-injection as the engine speed increases.

According to this configuration, since the ratio of the injection amount of the post-injection increases as the engine speed increases, the mixture gas having the high fuel concentration is reliably formed in a part of the combustion chamber. However, soot is easily generated when the fuel concentration is excessively high. In this regard, since the injection start timing of the post injection is advanced as the engine speed increases, when the engine speed is high, the fuel concentration is moderately increased.

On the other hand, since the ratio of the injection amount of the post-injection is reduced when the engine speed is low, the formation of mixture gas having an excessively high fuel concentration in a part of the combustion chamber is prevented and the generation of soot is reduced.

In this manner, according to these configurations, the stable partial compression-ignition combustion is performed by forming the mixture gas having the high fuel concentration in a part of the combustion chamber while reducing the soot generation, regardless of the engine speed being high or low.

During the partial compression-ignition combustion in which the swirl flow is generated and the fuel injection timing is retarded as the engine speed increases, the fuel injection timing controlling module may control the injector to perform the pre-injection on intake stroke when the engine speed is lower than a given value, and perform the pre-injection on compression stroke when the engine speed is higher than the given value.

Thus, during the partial compression-ignition combustion, the mixture gas having a suitable fuel concentration corresponding to the engine speed is formed.

The injector may at least have a first nozzle port and a second nozzle port disposed at a center portion of a ceiling surface of the combustion chamber and separated from each other in a circumferential direction of the injector, the first and second nozzle ports simultaneously injecting the fuel. The swirl flow may be an inclined swirl flow flowing nonparallel to a plane perpendicular to a center axis of the combustion chamber. The first and second nozzle ports may be positioned and oriented so that a first fuel portion injected by the first nozzle port that has reached the swirl flow moves downstream along the swirl flow and then joins with a second fuel portion injected by the second nozzle port that has reached the swirl flow.

Thus, the flame core is reliably formed and grows in the center part of the combustion chamber.

During a partial compression-ignition combustion in an operating range with a higher load than that of an operating range where the partial compression-ignition combustion, in which the swirl flow is generated and the fuel injection timing is retarded as the engine speed increases, is performed, the swirl adjusting module may cause the swirl valve to generate the swirl flow and the fuel injection timing controlling module may control the injector to inject the fuel dividedly a plurality of times and the start timing of the first injection to be performed may be substantially fixed regardless of the engine speed.

Thus, the mixture gas having the suitable fuel concentration corresponding to the engine speed is formed during the partial compression-ignition combustion at the higher load side.

During the partial compression-ignition combustion in the operating range with the higher load, the fuel injection timing controlling module may reduce the number of divided injections by the injector as the engine speed increases.

According to this configuration, at the high load and high speed side, the formation of the mixture gas having excessively high fuel concentration is prevented and the mixture gas is suitably combusted. For example, when the engine load is high, the amount of fuel injected into the combustion chamber increases, and when the engine speed is high, a time length corresponding to one crank angle becomes short. Therefore, if the number of times of fuel injections is increased when the engine load is high and the engine speed is high, new fuel is added in a state where the precedingly injected fuel is not sufficiently vaporized and diffused, and the mixture gas having excessively high fuel concentration is formed. Therefore, during the partial compression-ignition combustion at the higher load side, by reducing the number of times of fuel injections by the injector as the engine speed increases, the formation of the mixture gas having excessively high fuel concentration at the high speed side is prevented.

DETAILED DESCRIPTION OF THE DISCLOSURE (1) Overall Configuration of Engine

Figure 1:
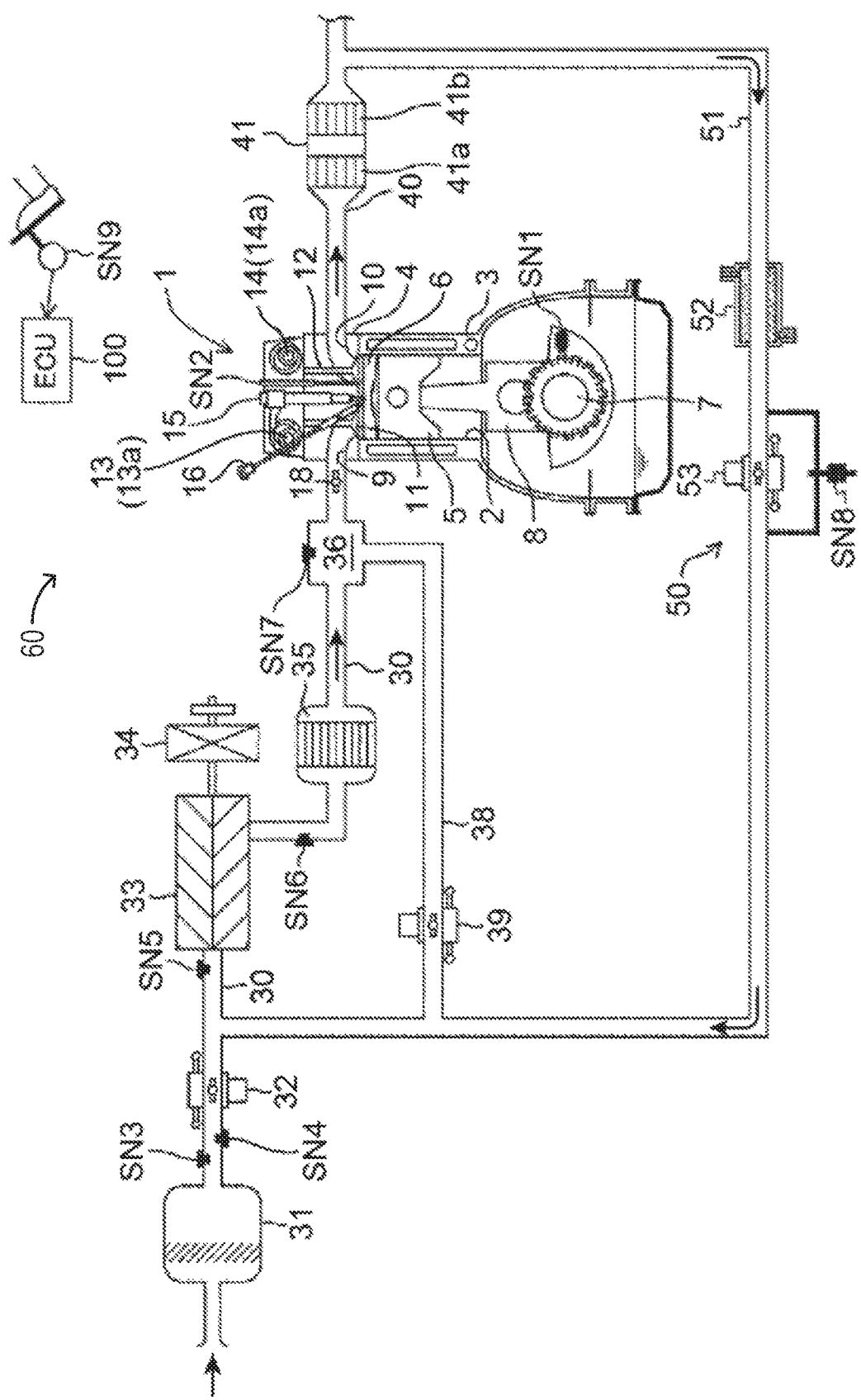
FIG. 1 is a system diagram schematically illustrating an overall configuration of a compression-ignition engine according to one embodiment of the present disclosure.
Figure 2:
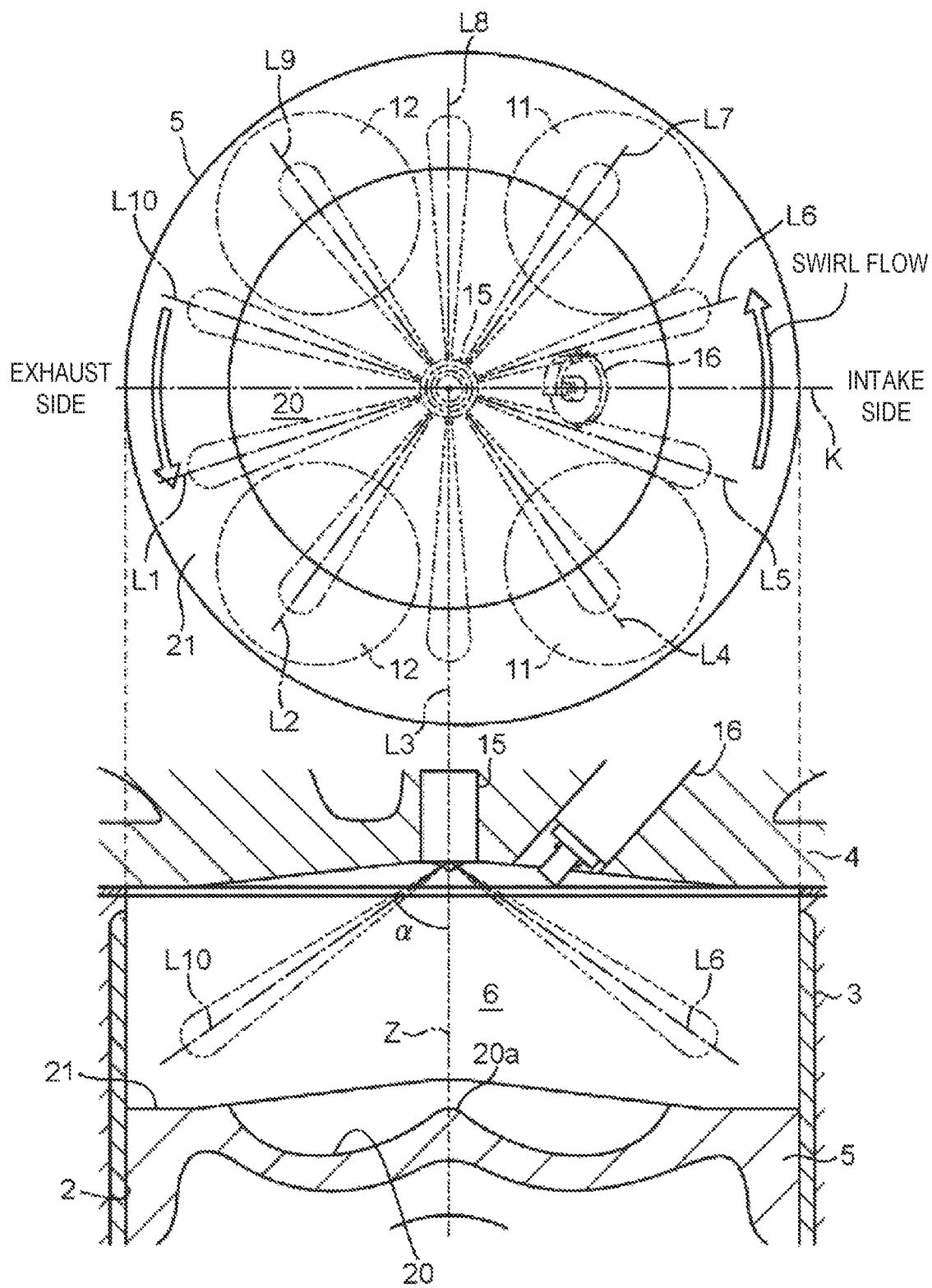
FIG. 2 shows diagrams illustrating a cross-sectional view of a combustion chamber and a plan view of a piston.

FIGS. 1 and 2 are diagrams illustrating a suitable embodiment of a compression-ignition engine (hereinafter, simply referred to as "the engine") to which a control system of the present disclosure is applied. The engine illustrated in FIGS. 1 and 2 is a four-cycle gasoline direct-injection engine mounted on a vehicle as a drive source for traveling, and includes an engine body 1, an intake passage 30 through which intake air to be introduced into the engine body 1 flows, an exhaust passage 40 through which exhaust gas discharged from the engine body 1 flows, and an external exhaust gas recirculation (EGR) device 50 which recirculates a portion of the exhaust gas flowing through the exhaust passage 40 to the intake passage 30.

The engine body 1 has a cylinder block 3 formed therein with cylinders 2, a cylinder head 4 attached to an upper surface of the cylinder block 3 so as to cover above the cylinders 2, and a piston 5 reciprocatably fitted into each cylinder 2. Typically, the engine body 1 is of a multi-cylinder type having a plurality of cylinders (e.g., four cylinders). Here, the description is only given regarding one cylinder 2 for the sake of simplicity.

A combustion chamber 6 is defined above the piston 5, and fuel containing gasoline as a main component is injected into the combustion chamber 6 by an injector 15 (described later). Further, the supplied fuel is combusted while being mixed with air in the combustion chamber 6, and an expansion force caused by this combustion pushes down the piston 5 and thus it reciprocates in up-and-down directions of the cylinder. Note that the fuel injected into the combustion chamber 6 may be any fuel as long as it contains gasoline as a main component and, for example, it may contain a subcomponent, such as bioethanol, in addition to gasoline.

A crankshaft 7, which is an output shaft of the engine body 1, is provided below the piston 5. The crankshaft 7 is connected to the piston 5 via a connecting rod 8 and rotates about its center axis according to the reciprocation (up-and-down motion) of the piston 5.

A geometric compression ratio of the cylinder 2, that is, a ratio of the volume of the combustion chamber 6 when the piston 5 is at a top dead center (TDC) with the volume of the combustion chamber 6 when the piston 5 is at a bottom dead center (BDC), is set between 13:1 and 30:1, preferably between 14:1 and 18:1, as a suitable value for SPCCI combustion (partial compression-ignition combustion) described later. More specifically, the geometric compression ratio of the cylinder 2 is set between 14:1 and 17:1 in regular specifications using gasoline fuel having an octane number of about 91, and between 15:1 and 18:1 in high-octane specifications using gasoline fuel having an octane number of about 96.

The cylinder block 3 is provided with a crank angle sensor SN1 which detects a rotational angle of the crankshaft 7 (crank angle) and rotational speed (engine speed) of the crankshaft 7.

The cylinder head 4 is formed with an intake port 9 and an exhaust port 10 which open into the combustion chamber 6, and provided with an intake valve 11 which opens and closes the intake port 9, and an exhaust valve 12 which opens and closes the exhaust port 10. Note that as illustrated in FIG. 2, the type of valve of the engine of this embodiment is a four-valve type including two intake valves and two exhaust valves. That is, the intake port 9 includes a first intake port 9A and a second intake port 9B, and the exhaust port 10 includes a first exhaust port 10A and a second exhaust port 10B. The intake valve 11 is provided to each of the first and second intake ports 9A and 9B, and the exhaust valve 12 is provided to each of the first and second exhaust ports 10A and 10B.

Figure 3:
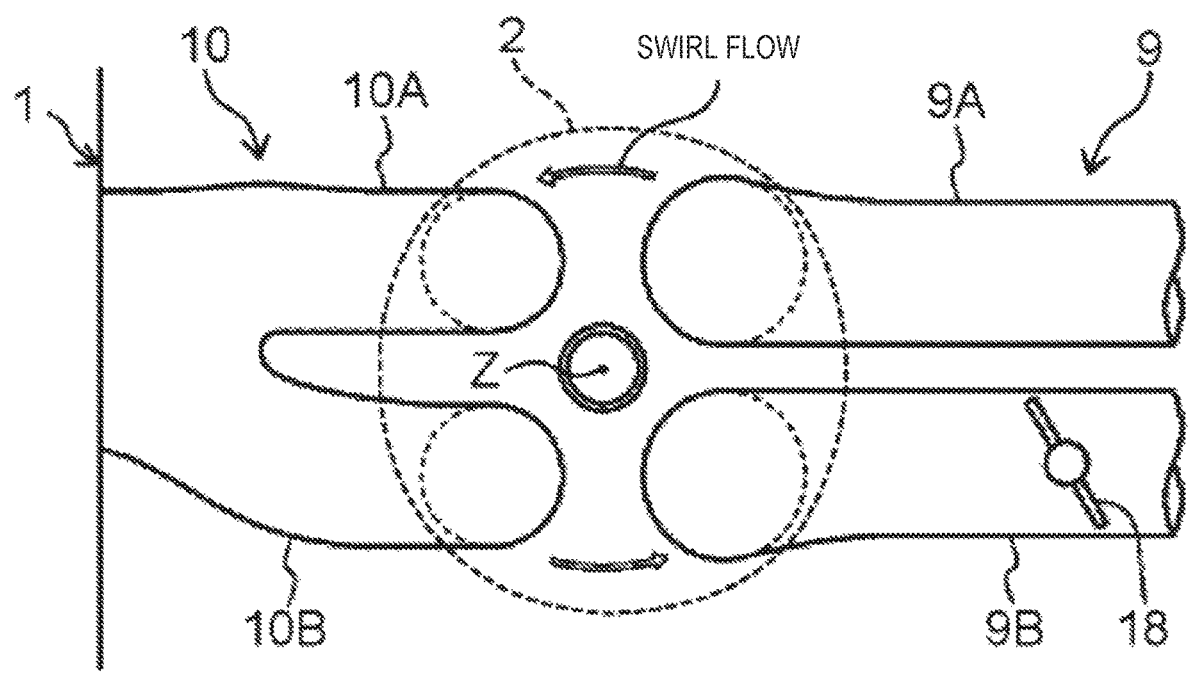
FIG. 3 is a schematic plan view illustrating a structure of a cylinder and intake and exhaust systems in the vicinity thereof.

As illustrated in FIG. 3, a swirl valve 18 configured to open and close the second intake port 9B is provided therein. The swirl valve 18 is only provided to the second intake port 9B and not to the first intake port 9A. When such a swirl valve 18 is driven in the closing direction, since a rate of intake air flowing into the combustion chamber 6 from the first intake port 9A (in which the swirl valve 18 is not provided) increases, a circling flow circling around an axial line Z of the cylinder (a center axis of the combustion chamber 6), that is, the swirl flow, is enhanced. Conversely, driving the swirl valve 18 in the opening direction weakens the swirl flow. Note that the intake port 9 of this embodiment is a tumble port formable of a tumble flow (vertical vortex). Therefore, the swirl flow formed when closing the swirl valve 18 is an inclined swirl flow mixed with the tumble flow.

The intake valve 11 and the exhaust valve 12 are driven to open and close in conjunction with the rotation of the crankshaft 7 by valve operating mechanisms 13 and 14 including a pair of camshafts disposed in the cylinder head 4.

The valve operating mechanism 13 for the intake valve 11 is built therein with an intake variable valve timing mechanism (VVT) 13a configured to change open and close timings of the intake valve 11. Similarly, the valve operating mechanism 14 for the exhaust valve 12 is built therein with an exhaust VVT 14a configured to change open and close timings of the exhaust valve 12. The intake VVT 13a (exhaust VVT 14a) is a so-called variable phase mechanism which simultaneously changes the open and close timings of the intake valve 11 (exhaust valve 12) in the same amount. By controlling the intake VVT 13a and the exhaust VVT 14a, in this embodiment, a valve overlap period in which both the intake and exhaust valves 11 and 12 are opened over TDC of exhaust stroke (ETDC) is adjusted, and by adjusting the valve overlap period, an amount of residual burned gas in the combustion chamber 6 (internal EGR gas) is adjusted.

The cylinder head 4 is provided with the injector 15 which injects the fuel (mainly gasoline) into the combustion chamber 6, and a spark plug 16 which ignites a mixture gas containing the fuel injected into the combustion chamber 6 from the injector 15 and air introduced into the combustion chamber 6. The cylinder head 4 is further provided with an in-cylinder pressure sensor SN2 which detects pressure of the combustion chamber 6 (hereinafter, also referred to as "in-cylinder pressure").

As illustrated in FIG. 2, on a crown surface of the piston 5, a cavity 20 is formed by denting a relatively wide area of the piston 5, including a center part thereof, to the opposite side from the cylinder head 4 (downward). A center section of the cavity 20 is formed with a bulge portion 20a having a substantially conical shape, bulging relatively upward, and both sides of the cavity 20 over the bulge portion 20a in radial directions respectively form a bowl-shaped recessed portion in cross section. In other words, the cavity 20 is a recessed portion having a donut shape in plan view, formed to surround the bulge portion 20a. Further, a section of the crown surface of the piston 5 radially outward of the cavity 20 is a squish portion 21 comprised of an annular flat surface.

The injector 15 is disposed in a center portion of a ceiling surface of the combustion chamber 6, and its tip portion opposes to the center portion (bulge portion 20a) of the crown surface of the piston 5. The injector 15 is a multi-port injector having a plurality of nozzle ports at its tip portion. For example, the injector 15 has a total of ten nozzle ports circumferentially arranged at an even interval, and the ports simultaneously inject the fuel to spread radially (obliquely downwardly). Lines L1 to L10 illustrated in FIG. 2 indicate center lines of the sprays of the fuel injected from the respective nozzle ports. When an angle at which each of the center lines L1 to L10 of the sprays intersects the cylinder axis Z is $\alpha$, this intersecting angle $\alpha$ is 30-60°, preferably approximately 45°. That is, when the injector 15 injects the fuel, the sprays from the nozzle ports simultaneously spread in directions at angles of 30-60° (preferably 45°) from the cylinder axis Z.

With the total of ten nozzle ports provided in the injector 15 at the even interval as in this embodiment, the center lines L1 to L10 of the sprays are arranged, 36° away from each other centering on the cylinder axis Z. When a line extending perpendicularly to the intake-exhaust direction of the engine and extending perpendicular to the cylinder axis Z is a reference line K, the center lines L1 to L5 and the center lines L6 to L10 which are located opposite to each other with respect to the reference line K are in a line symmetric relationship to each other with respect to the reference line K.

The spark plug 16 is located slightly off from the injector 15 to the intake side. The tip portion (electrode portion) of the spark plug 16 is set at a position overlapping with the cavity 20 in the plan view.

As illustrated in FIG. 1, the intake passage 30 is connected to one side surface of the cylinder head 4 to communicate with the intake port 9. Air (fresh air) taken in from an upstream end of the intake passage 30 is introduced into the combustion chamber 6 through the intake passage 30 and the intake port 9.

In the intake passage 30, an air cleaner 31 which removes foreign matters within the intake air, a throttle valve 32 which adjusts a flow rate of intake air, a booster 33 which pumps the intake air while compressing it, an intercooler 35 which cools the intake air compressed by the booster 33, and a surge tank 36 are provided in order from the upstream side.

An airflow sensor SN3 which detects the flow rate of intake air, first and second intake air temperature sensors SN4 and SN6 which detect a temperature of the intake air, and first and second intake air pressure sensors SN5 and SN7 which detect a pressure of the intake air are provided in various parts of the intake passage 30. The airflow sensor SN3 and the first intake air temperature sensor SN4 are provided in a portion of the intake passage 30 between the air cleaner 31 and the throttle valve 32, and detect the flow rate and the temperature of the intake air passing through this portion. The first intake air pressure sensor SN5 is provided in a portion of the intake passage 30 between the throttle valve 32 and the booster 33 (downstream of a connection port of an EGR passage 51 described later), and detects the pressure of the intake air passing through this portion. The second intake air temperature sensor SN6 is provided in a portion of the intake passage 30 between the booster 33 and the intercooler 35, and detects the temperature of intake air passing through this portion. The second intake air pressure sensor SN7 is provided in the surge tank 36 and detects the pressure of intake air in the surge tank 36.

The booster 33 is a mechanical booster (supercharger) mechanically linked to the engine body 1. Although the specific type of the booster 33 is not particularly limited, for example, any of known boosters, such as Lysholm type, Roots type, or centrifugal type, may be used as the booster 33.

An electromagnetic clutch 34 electrically switchable of its operation mode between "engaged" and "disengaged" is provided between the booster 33 and the engine body 1. When the electromagnetic clutch 34 is engaged, a driving force is transmitted from the engine body 1 to the booster 33, and boosting by the booster 33 is performed. On the other hand, when the electromagnetic clutch 34 is disengaged, the transmission of the driving force is interrupted, and the boosting by the booster 33 is stopped.

A bypass passage 38 which bypasses the booster 33 is provided in the intake passage 30. The bypass passage 38 connects the surge tank 36 to the EGR passage 51 described later. A bypass valve 39 is provided in the bypass passage 38.

The exhaust passage 40 is connected to the other side surface of the cylinder head 4 so as to communicate with the exhaust port 10. The burned gas generated in the combustion chamber 6 is discharged outside through the exhaust port 10 and the exhaust passage 40.

A catalytic converter 41 is provided in the exhaust passage 40. The catalytic converter 41 is built therein with a three-way catalyst 41a which purifies hazardous components (HC, CO and $NO_x$) contained within the exhaust gas flowing through the exhaust passage 40, and a GPF (gasoline-particulate filter) 41b which captures particulate matter (PM) contained within the exhaust gas. Note that another catalytic converter built therein with a suitable catalyst, such as a three-way catalyst or a $NO_x$ catalyst, may be added downstream of the catalytic converter 41.

The external EGR device 50 has the EGR passage 51 connecting the exhaust passage 40 to the intake passage 30, and an EGR cooler 52 and an EGR valve 53 which are provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools the exhaust gas recirculated from the exhaust passage 40 to the intake passage 30 through the EGR passage 51 (external EGR gas) by heat exchange. The EGR valve 53 is provided in the EGR passage 51 downstream of the EGR cooler 52 (the side close to the intake passage 30), and adjusts the flow rate of the exhaust gas flowing through the EGR passage 51.

The EGR cooler 52 uses cooling water for cooling the engine body 1, as a medium (coolant) for heat exchange. The temperature of the external EGR gas to be recirculated to the intake passage 30 after being cooled by the EGR cooler 52, although significantly drops compared to the temperature of the exhaust gas immediately after being discharged from the combustion chamber 6, exceeds an outdoor temperature. Therefore, while the external EGR is executed, a compression start temperature which is a temperature of the combustion chamber 6 when the compression stroke is substantially started (the intake valve 11 is closed), becomes higher than while the external EGR is not executed.

A pressure difference sensor SN8 which detects a difference between pressure upstream of the EGR valve 53 and pressure downstream thereof is provided in the EGR passage 51.

(2) Control System

Figure 4:
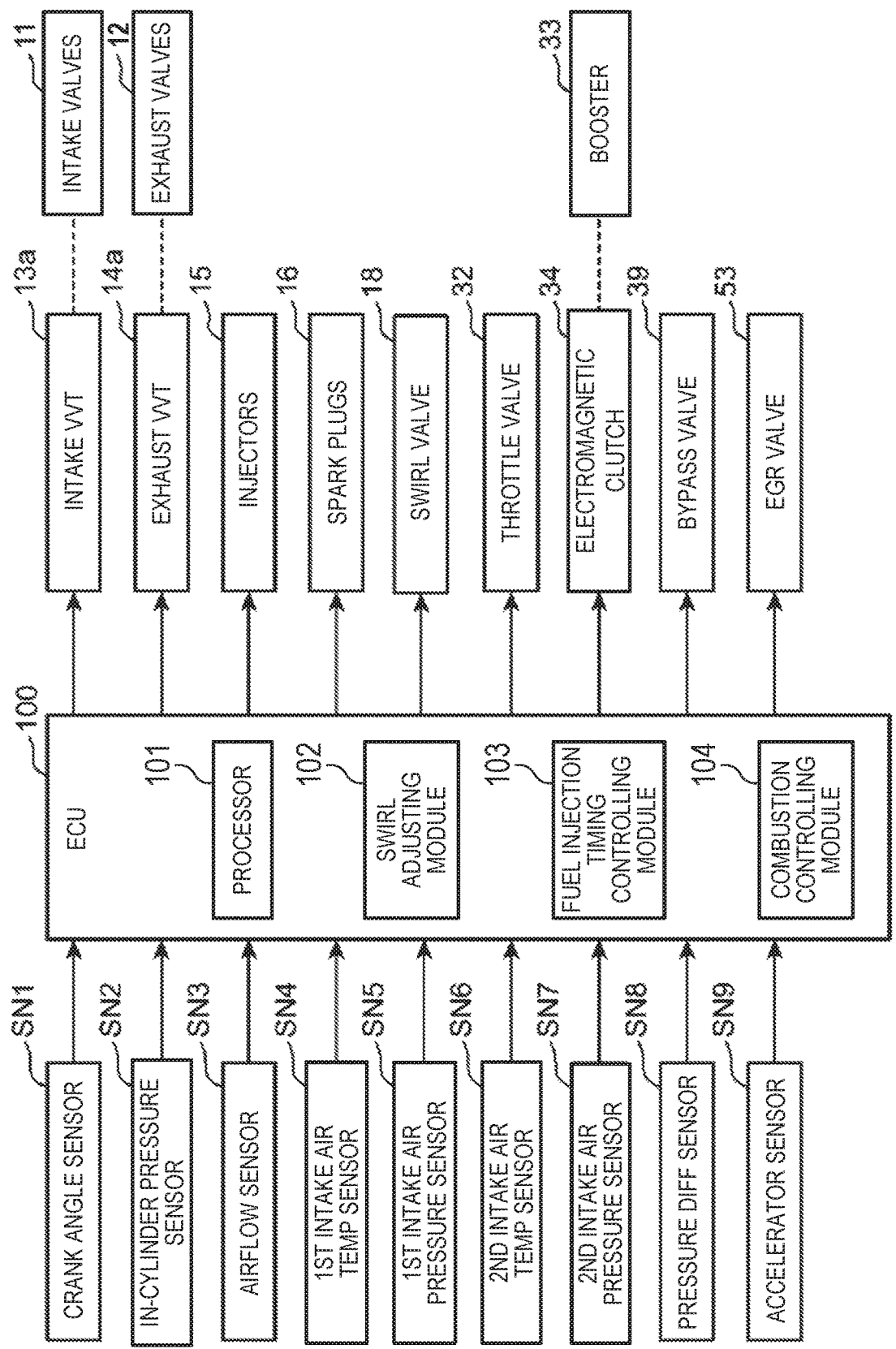
FIG. 4 is a block diagram illustrating a control system of the engine.

FIG. 4 is a block diagram illustrating a control system 60 of the engine. Some components of the engine are not illustrated in FIG. 4. An ECU (electronic control unit) 100 illustrated in FIG. 4 is a microprocessor which comprehensively controls the engine, and comprised of a well-known processor 101 such as a CPU having associated ROM, RAM, etc. The processor 101 is configured to execute a swirl adjusting module 102 to control the swirl valve 18, a fuel injection timing controlling module 103 to control a timing of the fuel injection by the injector 15, and a combustion controlling module 104 to output an ignition instruction to the spark plug 16 to ignite at a given ignition timing. These modules are stored in non-transitory memory of the ECU 100 as software.

The ECU 100 receives detection signals from various sensors. For example, the ECU 100 is electrically connected to the crank angle sensor SN1, the in-cylinder pressure sensor SN2, the airflow sensor SN3, the first and second intake air temperature sensors SN4 and SN6, the first and second intake air pressure sensors SN5 and SN7, and the pressure difference sensor SN8, which are described above. The ECU 100 sequentially receives the information detected by these sensors (i.e., the crank angle, the engine speed, the in-cylinder pressure, the intake air flow rate, the intake air temperatures, the intake air pressures, the difference in pressure between the upstream and downstream sides of the EGR valve 53, etc.).

Further, an accelerator sensor SN9 which detects an opening of an accelerator pedal controlled by a vehicle driver driving the vehicle is provided in the vehicle, and a detection signal from the accelerator sensor SN9 is also inputted to the ECU 100.

The ECU 100 controls various components of the engine while executing various determinations and calculations based on the input signals from the various sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on various calculation results.

Note that the ECU 100 as described above corresponds to "controller."

(3) Control According to Operating State

Figure 5:
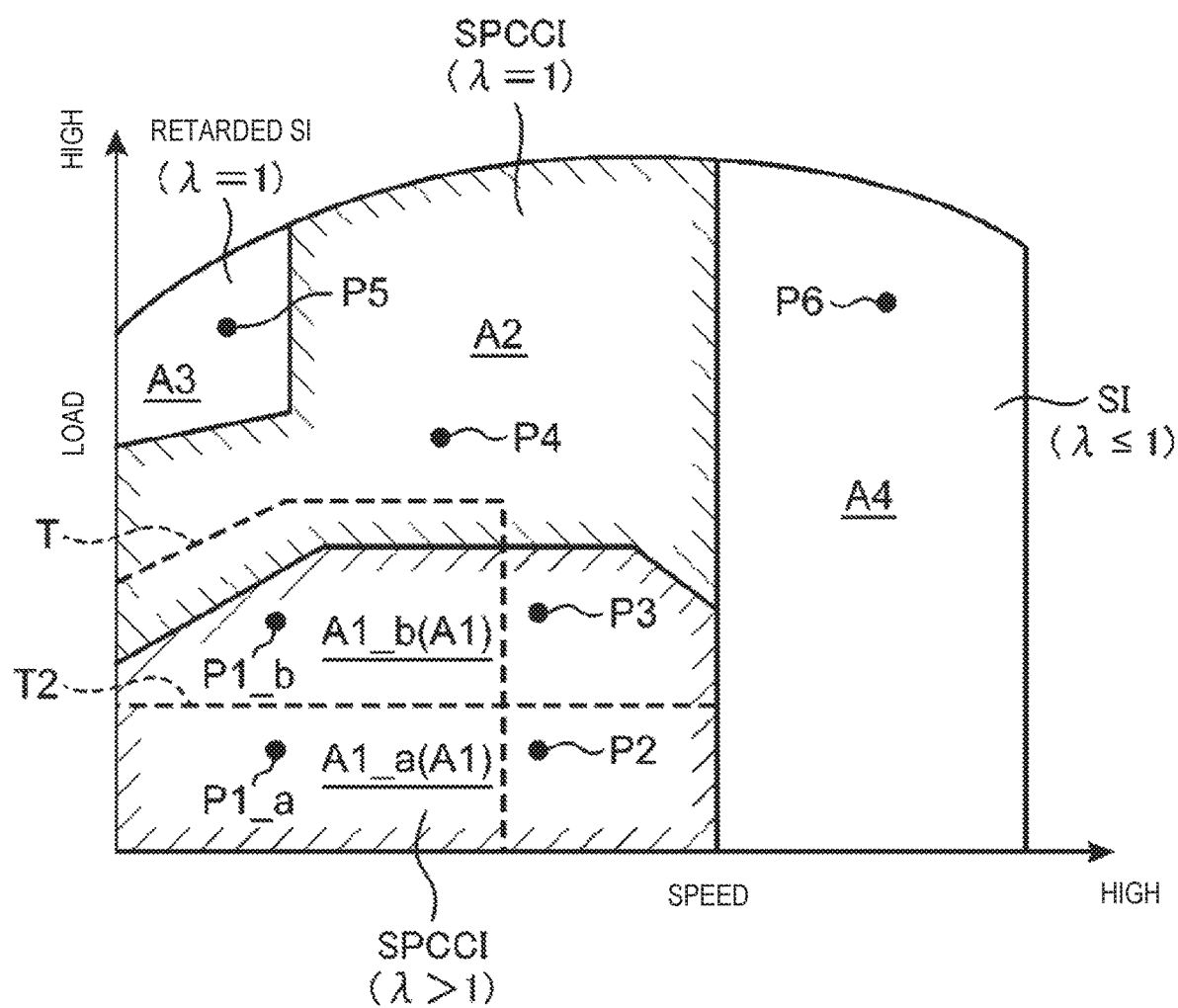
FIG. 5 is a map in which operating ranges of the engine are divided according to a difference in combustion mode.

FIG. 5 is a chart of a map illustrating a difference in control according to an engine speed and load. As illustrated in FIG. 5, an operating range of the engine is roughly divided into four operating ranges A1 to A4 due to the difference in combustion mode. The fourth operating range A4 is a high-speed range in which the engine speed is high. The first operating range A1 is a low and medium-speed, low-load range in which the engine speed is lower than the fourth operating range A4 and the engine load is low. The third operating range A3 is a low-speed high-load range in which the engine speed is low and the engine load is high. The second operating range A2 is a remaining range except for the first, third and fourth ranges A1, A3, and A4 (i.e., a range combining a low and medium-speed, medium-load range and a medium-speed, high-load range). Hereinafter, the combustion mode etc. selected in each operating range will be sequentially described.

(3-1) First Operating Range

Within the first operating range A1 in which the engine speed is low and the engine load is low, the partial compression-ignition combustion combining the SI combustion and the CI combustion (hereinafter referred to as "SPCCI combustion") is performed. The SI combustion is a mode in which the mixture gas is ignited by the spark plug 16 and is then forcibly combusted by flame propagation which spreads the combusting region from the ignition point, and the CI combustion is a mode in which the mixture gas is combusted by self-ignition in an environment increased in temperature and pressure due to the compression of the piston 5. The SPCCI combustion combining the SI combustion and the CI combustion is a combustion mode in which the SI combustion is performed on a portion of the mixture gas inside the combustion chamber 6 by the spark ignition performed in an environment immediately before the mixture gas self-ignites, and after the SI combustion, the CI combustion is performed on the remaining mixture gas in the combustion chamber 6 by self-ignition (by the further increase in temperature and pressure accompanying the SI combustion). Note that "SPCCI" is an abbreviation of "SPark Controlled Compression Ignition."

Figure 6:
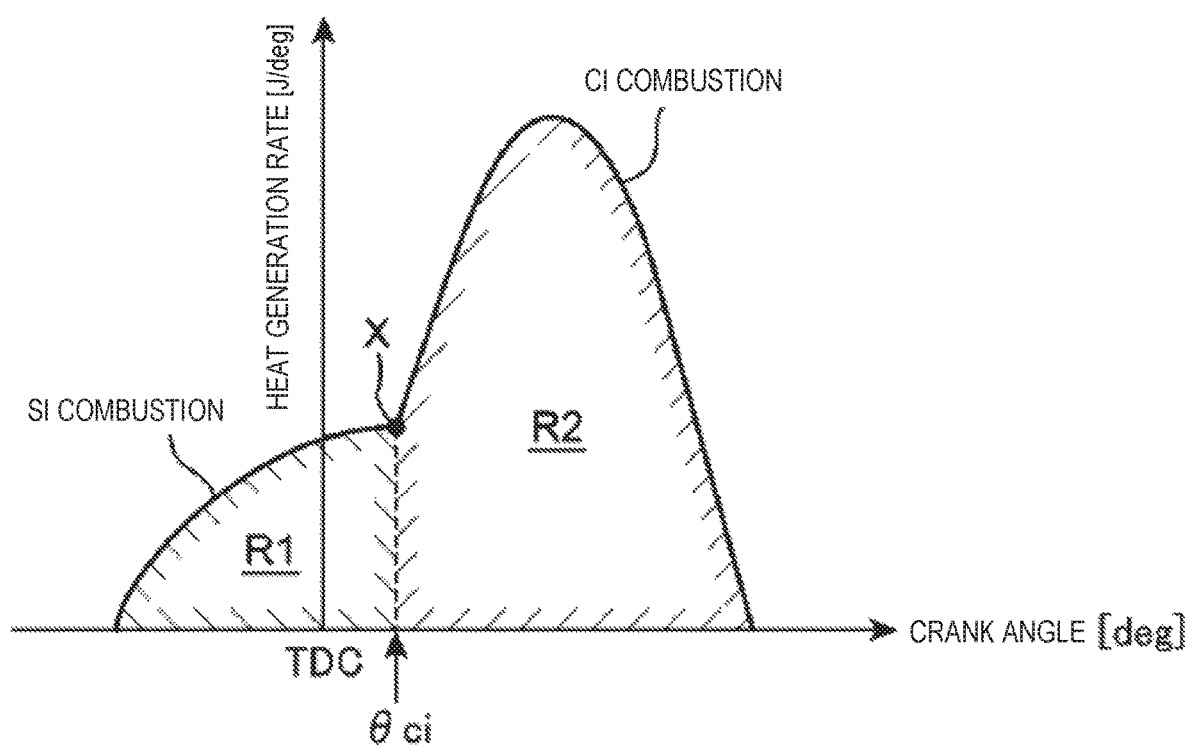
FIG. 6 is a chart illustrating a waveform of a heat generation rate in SPCCI combustion (partial compression-ignition combustion).

FIG. 6 is a chart illustrating a change in a heat generation rate (J/deg) according to the crank angle when the SPCCI combustion occurs.

The SPCCI combustion has a characteristic that the heat generation in the CI combustion is faster than that in the SI combustion. For example, as illustrated in FIG. 6, a waveform of a heat generation rate caused by the SPCCI combustion has a shape in which a rising slope in an early stage of the combustion which corresponds to the SI combustion is gentler than a rising slope caused corresponding to the CI combustion occurring subsequently. In other words, the waveform of the heat generation rate caused by the SPCCI combustion is formed to have a first heat generation rate portion formed by the SI combustion and having a relatively gentle rising slope, and a second heat generation rate portion formed by the CI combustion and having a relatively sharp rising slope, which are next to each other in this order. Further, corresponding to the tendency of such a heat generation rate, in the SPCCI combustion, a pressure increase rate (dp/dθ) inside the combustion chamber 6 caused by the SI combustion is lower than that in the CI combustion.

When the temperature and pressure inside the combustion chamber 6 rise due to the SI combustion, the unburned mixture gas self-ignites and the CI combustion starts. As illustrated in FIG. 6, the slope of the waveform of the heat generation rate changes from gentle to sharp at the timing of self-ignition (that is, the timing when the CI combustion starts). That is, the waveform of the heat generation rate caused by the SPCCI combustion has a flection point at a timing when the CI combustion starts (indicated by an "X" in FIG. 6).

After the CI combustion starts, the SI combustion and the CI combustion are performed in parallel. In the CI combustion, since the combustion speed of the mixture gas is faster than that in the SI combustion, the heat generation rate becomes relatively high. However, since the CI combustion is performed after TDC of compression stroke (CTDC), the slope of the waveform of the heat generation rate does not become excessive. That is, after CTDC, since the motoring pressure decreases due to the piston 5 descending, the rise of the heat generation rate is prevented, which avoids excessive $dp/d\theta$ in the CI combustion. In the SPCCI combustion, due to the CI combustion being performed after the SI combustion as described above, it is unlikely for $dp/d\theta$ which is an index of combustion noise to become excessive, and combustion noise is reduced compared to performing the CI combustion alone (in the case where the CI combustion is performed on all the fuel).

The SPCCI combustion ends as the CI combustion finishes. Since the combustion speed of the CI combustion is faster than that of the SI combustion, the combustion end timing is advanced compared to performing the SI combustion alone (in the case where the SI combustion is performed on all the fuel). In other words, the SPCCI combustion brings the combustion end timing closer to CTDC, on the expansion stroke. Thus, the SPCCI combustion improves the fuel efficiency compared to the SI combustion alone.

As specific modes of the SPCCI combustion, within the first operating range A1, a control for performing the SPCCI combustion of the mixture gas is performed while forming an environment in which an air-fuel ratio (A/F), which is a mass ratio of air (fresh air) to the fuel inside the combustion chamber 6, is larger than a stoichiometric air-fuel ratio (14.7:1) (hereinafter, referred to as A/F lean environment). In order to achieve such the SPCCI combustion under the A/F lean environment, within the first operating range A1, the various components of the engine are controlled by the ECU 100 as follows.

The booster 33 is controlled to be OFF inside a boost line T illustrated in FIG. 5, and be ON outside the boost line T. Inside the boost line T where the booster 33 is OFF, i.e., at the lower speed side of the first operating range A1, the electromagnetic clutch 34 is disengaged to disconnect the booster 33 from the engine body 1 and the bypass valve 39 is fully opened so as to stop boosting by the booster 33. Outside the boost line T where the booster 33 is ON, i.e., at the higher speed side of the first operating range A1, the electromagnetic clutch 34 is engaged to connect the booster 33 to the engine body 1 so as to perform boosting by the booster 33. Here, the opening of the bypass valve 39 is controlled so that the pressure in the surge tank 36 (boosting pressure) detected by the second intake air pressure sensor SN7 matches given target pressure determined for each operating condition (engine speed and engine load). For example, as the opening of the bypass valve 39 increases, the flow rate of the intake air which flows back to the upstream side of the booster 33 through the bypass passage 38 increases, and as a result, the pressure of the intake air introduced into the surge tank 36, that is, the boosting pressure, becomes low. By adjusting the backflow amount of the intake air in this manner, the bypass valve 39 controls the boosting pressure to the target pressure.

The intake VVT 13a and the exhaust VVT 14a set valve operation timings of the intake and exhaust valves 11 and 12 so that the valve overlap period in which both the intake and exhaust valves 11 and 12 are opened over ETDC is formed. As a result, the internal EGR which leaves the burned gas inside the combustion chamber 6 is achieved, and the temperature of the combustion chamber 6 is increased. That is, by opening the exhaust valve 12 until after ETDC (until the early stage of the intake stroke), the burned gas is drawn back into the combustion chamber 6 from the exhaust port 10 and the internal EGR is achieved. The valve overlap period (more specifically, the period in which the exhaust valve 12 is opened on the intake stroke) is adjusted so that an internal EGR ratio which is a ratio of the internal EGR gas introduced into the combustion chamber 6 increases as the engine load decreases.

Within the first operating range A1, a target internal EGR ratio which is a target value of the internal EGR ratio is set to increase substantially between 10 and 50% as the engine load decreases. Note that the internal EGR ratio used here is a mass ratio of the residual burned gas inside the combustion chamber 6 (internal EGR gas) to all the gas inside the combustion chamber 6. Further, the concept of the residual burned gas inside the combustion chamber 6 includes, not only the burned gas residing inside the combustion chamber 6 without being discharged to the exhaust port 10, but also the burned gas returned into the combustion chamber 6 from the exhaust port 10 by opening the exhaust valve 12 on the intake stroke.

The EGR valve 53 is opened in a major segment of the first operating range A1. Specifically, the EGR valve 53 is opened in the major segment of the first operating range A1 which is other than its low speed section, and the opening of the EGR valve 53 in this opened segment is larger as the engine speed is higher. Thus, an external EGR ratio which is a ratio of exhaust gas recirculated to the combustion chamber 6 through the EGR passage 51 (external EGR gas) is adjusted to increase as the engine speed increases.

Within the first operating range A1, a target external EGR ratio which is a target value of the external EGR ratio is set to increase substantially between 0 and 20% as the engine speed or load increases. Note that the external EGR ratio used here is a mass ratio of exhaust gas recirculated to the combustion chamber 6 through the EGR passage 51 (external EGR gas) to all the gas inside the combustion chamber 6.

The throttle valve 32 is fully opened. Thus, a relatively large amount of air (fresh air) is introduced into the combustion chamber 6 and A/F is set larger than the stoichiometric air-fuel ratio. In other words, within the first operating range A1, the SPCCI combustion is performed in the A/F lean environment in which an excess air ratio $\lambda$ which is a value obtained by dividing an actual air-fuel ratio by the stoichiometric air-fuel ratio is larger than 1. For example, the excess air ratio $\lambda$ within the first operating range A1 is set to 2 or above so that an amount of $NO_x$ generated by the combustion is sufficiently reduced. Note that in this embodiment, while the internal EGR and the external EGR are executed within the first operating range A1 as described above, the amount of EGR gas introduced into the combustion chamber 6 by both the internal and external EGR (the internal EGR gas and the external EGR gas) needs to be set so that an amount of air equivalent to the target air-fuel ratio ($\lambda$>2) is secured inside the combustion chamber 6. Respective target values of the internal EGR ratio and the external EGR ratio within the first operating range A1 are determined in advance to fulfill these requirements. That is, in this embodiment, the target values of the internal EGR ratio and the external EGR ratio are set so that an amount of gas obtained by subtracting an air amount equivalent to the target air-fuel ratio ($\lambda$>2) from the total gas amount introduced into the combustion chamber 6 in the state where the throttle valve 32 is fully opened is introduced into the combustion chamber 6 as the internal EGR gas and the external EGR gas. Further, the valve overlap period and the opening of the EGR valve 53 are respectively adjusted according to the target values of the EGR ratios.

The opening of the swirl valve 18 is set smaller than a half-opened state (50%). By reducing the opening of the swirl valve 18, a major portion of the intake air introduced into the combustion chamber 6 is sucked in from the first intake port 9A (the intake port to which the swirl valve 18 is not provided), and a strong swirl flow is formed inside the combustion chamber 6. This swirl flow grows on the intake stroke, remains until an intermediate section of the compression stroke, and stimulates stratification of the fuel. That is, a concentration difference that the fuel concentration is higher in the center portion of the combustion chamber 6 than outside thereof (outer circumferential portion) is formed. Although described in detail in Section (4-2) later, within the first operating range A1, the air-fuel ratio in the center portion of the combustion chamber 6 is set to between 20:1 and 30:1 and the air-fuel ratio in an outer circumferential portion of the combustion chamber 6 is set to 35:1 or above. Further, the opening of the swirl valve 18 is reduced to be smaller as the engine speed is lower. Thus, the intensity of the swirl flow is adjusted to be higher as the engine speed is lower.

The injector 15 injects the fuel by splitting it into a plurality of injections from the intake stroke to the compression stroke. Further, the spark plug 16 ignites the mixture gas near CTDC. For example, within the first operating range A1, the spark plug 16 ignites the mixture gas at a slightly advanced timing from CTDC. This ignition triggers the SPCCI combustion, a portion of the mixture gas in the combustion chamber 6 is combusted through flame propagation (SI combustion), and then the remaining mixture gas is combusted by self-ignition (CI combustion). The details of the injection pattern in the first operating range A1 will be described later.

(3-2) Second Operating Range

Figure 7:
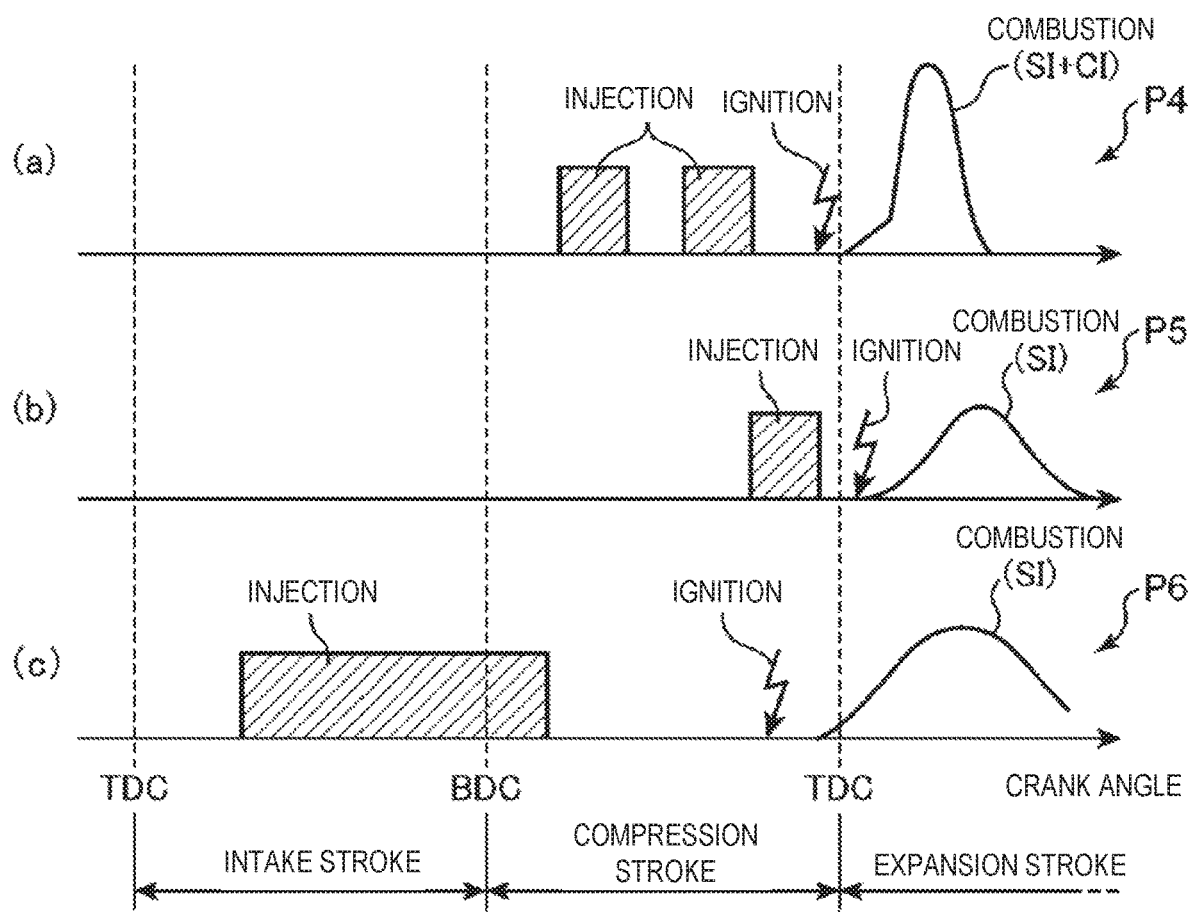
FIG. 7 shows time charts schematically illustrating a combustion control executed in each operating range of the engine.

FIG. 7 is a chart illustrating an injection pulse of the injector 15, the ignition timing (the timing when the spark plug 16 ignites the mixture gas) and the heat generation rate at an operation point P4 within the second operating range A2, an operation point P5 within the third operating range A3, and an operation point P6 within the fourth operating range A4. The width of the injection pulse indicates the injection amount, and the injection amount is larger as the width of the injection pulse increases.

Within the second operating range A2 (a range combined the low and medium-speed, medium-load range and the medium-speed, high-load range), a control for performing the SPCCI combustion of the mixture gas is performed while forming an environment in which a gas air-fuel ratio (G/F), which is a ratio of all the gas to the fuel inside the combustion chamber 6, is larger than the stoichiometric air-fuel ratio (14.7:1) and A/F substantially matches the stoichiometric air-fuel ratio (hereinafter, referred to as G/F lean environment), is executed. For example, in order to achieve the SPCCI combustion in such a G/F lean environment, within the second operating range A2, various components of the engine are controlled by the ECU 100 as follows.

The injector 15 injects at least a portion of the fuel to be injected in one combustion cycle, during the compression stroke. For example, at an operation point P4 within the second operating range A2, the injector 15 injects the fuel separately in two times in an early half and latter half of the compression stroke, as illustrated in Part (a) of FIG. 7.

The spark plug 16 ignites the mixture gas near CTDC. For example, at the operation point P4, the spark plug 16 ignites the mixture gas at a slightly advanced timing from CTDC. This ignition triggers the SPCCI combustion, and a portion of the mixture gas inside the combustion chamber 6 is combusted through flame propagation caused by spark ignition (SI combustion), then the remaining mixture gas is combusted by self-ignition (CI combustion).

The booster 33 is controlled to be OFF in a section of the low-load and low-speed range overlapping with the section inside the boost line T, and be ON outside this section. When the booster 33 is ON and boosting the intake air, the opening of the bypass valve 39 is controlled so that the pressure inside the surge tank 36 (boosting pressure) matches with the target pressure.

The intake VVT 13a and the exhaust VVT 14a set the valve operation timings of the intake and exhaust valves 11 and 12 so that the valve overlap period of a given length is formed. Note that since the boosting is performed (i.e., the intake air pressure is increased) within substantially the entire second operating range A2, even when the exhaust valve 12 is opened on the intake stroke, the backflow of the burned gas into the combustion chamber 6 from the exhaust port 10 (i.e., internal EGR) does not easily occur. Thus, the internal EGR ratio within the second operating range A2 is smaller than that within the first operating range A1, and the internal EGR is substantially stopped particularly in the higher load side of the second operating range A2.

The throttle valve 32 is fully opened.

The opening of the EGR valve 53 is controlled so that the air-fuel ratio (A/F) in the combustion chamber 6 becomes the stoichiometric air-fuel ratio ($\lambda=1$) or therearound. For example, the EGR valve 53 adjusts the amount of the exhaust gas recirculated through the EGR passage 51 (external EGR gas) so that the excess air ratio $\lambda$ becomes $1\pm0.2$. Note that since the air amount equivalent to the stoichiometric air-fuel ratio increases as the engine load increases, accordingly the external EGR ratio within the second operating range A2 is set to be smaller as the engine load increases (in other words, it is set to be larger as the engine load decreases). The opening of the EGR valve 53 is controlled according to the target value of the external EGR ratio set in this manner.

The opening of the swirl valve 18 is set substantially the same as within the first operating range A1 or a given intermediate opening larger than this opening.

(3-3) Third Operating Range

Within the third operating range A3 on the low-speed and high-load side, a control is executed in which at least a portion of the fuel is injected in the final stage of the compression stroke and the mixture gas is subjected to the SI combustion. For example, in order to achieve the SI combustion accompanied by such a retarded injection, within the third operating range A3, the various components of the engine are controlled by the ECU 100 as follows.

The injector 15 injects at least a portion of the fuel to be injected in one combustion cycle in the final stage of the compression stroke. For example, at an operation point P5 included in the third operating range A3, as illustrated in Part (b) of FIG. 7, the injector 15 injects all the fuel to be injected in one cycle in the final stage of the compression stroke (immediately before CTDC).

The spark plug 16 ignites the mixture gas at a relatively retarded timing, for example 5° C.A to 20° C.A from CTDC. Further, this ignition triggers the SI combustion, and all the mixture gas in the combustion chamber 6 combusts through flame propagation. Note that the reason why the ignition timing within the third operating range A3 is retarded as described above is to prevent abnormal combustion, such as knocking and pre-ignition. However, within the third operating range A3, the fuel injection is set to be performed in the final stage of the compression stroke (immediately before CTDC), which is considerably late, therefore, even with the ignition timing retarded as described above, the combustion speed after the ignition (flame propagation speed) is relatively fast. That is, since the period from the fuel injection to the ignition is sufficiently short, the flow (turbulence kinetic energy) in the combustion chamber 6 at the ignition timing becomes relatively strong, and the combustion speed after the ignition is accelerated using this flow. Thus, thermal efficiency is kept high while preventing abnormal combustion.

The booster 33 is controlled to be ON and performs boosting. The boosting pressure here is adjusted by the bypass valve 39.

The throttle valve 32 is fully opened.

The opening of the EGR valve 53 is controlled so that the air-fuel ratio (A/F) in the combustion chamber 6 becomes the stoichiometric air-fuel ratio ($\lambda=1$) or thereabound. For example, the EGR valve 53 adjusts the amount of the exhaust gas recirculated through the EGR passage 51 (external EGR gas) so that the excess air ratio $\lambda$ becomes $1\pm0.2$.

The opening of the swirl valve 18 is set to or near a half-opened state (50%).

(3-4) Fourth Operating Range

Within the fourth opening range A4 on the higher speed side of the first to third operating ranges A1 to A3, relatively basic SI combustion is executed. In order to achieve this SI combustion, within the fourth operating range A4, the various components of the engine are controlled by the ECU 100 as follows.

The injector 15 at least injects the fuel over a given period overlapping with the intake stroke. For example, at an operation point P6 within the fourth operating range A4, the injector 15 injects the fuel over a continuous period from the intake stroke to the compression stroke, as illustrated in Part (c) of FIG. 7. Note that since the operation point P6 corresponds to a considerably high-speed and high-load condition, the amount of fuel to be injected in one combustion cycle is large and also a crank angle period required for injecting the required amount of fuel becomes long, for which the fuel injection period at the operation point P6 is longer than the other operation points (P4, P5) described above.

The spark plug 16 ignites the mixture gas near CTDC. For example, at the operation point P6, the spark plug 16 ignites the mixture gas at a slightly advanced timing from CTDC. Further, this ignition triggers the SI combustion, and all the mixture gas in the combustion chamber 6 combusts through flame propagation.

The booster 33 is controlled to be ON and performs boosting. The boosting pressure here is adjusted by the bypass valve 39.

The throttle valve 32 is fully opened.

The opening of the EGR valve 53 is controlled so that the air-fuel ratio (A/F) in the combustion chamber 6 becomes the stoichiometric air-fuel ratio or slightly richer ($\lambda\leq1$).

The swirl valve 18 is fully opened. Thus, not only the first intake port 9A but also the second intake port 9B are fully opened and charging efficiency of the engine is improved.

(4) Injection Pattern within First Operating Range

Next, the details of the fuel injection control within the first operating range A1 will be described. The injection pattern with respect to the engine speed changes differently between the low load side and the high load side within the first operating range A1. Hereinafter, a low engine load segment of the first operating range A1 is referred to as a low-load first segment A1_a, and a high engine load segment than the low-load first segment A1_a within the first operating range A1 is referred to as a high-load first segment A1_b. For example, as illustrated in FIG. 5, the low-load first segment A1_a is a segment where the engine load is lower than a given reference load T2 within the first operating range A1, and the high-load first segment A1_b is a segment where the engine load is higher than the given reference load T2 within the first operating range A1.

Figure 8:
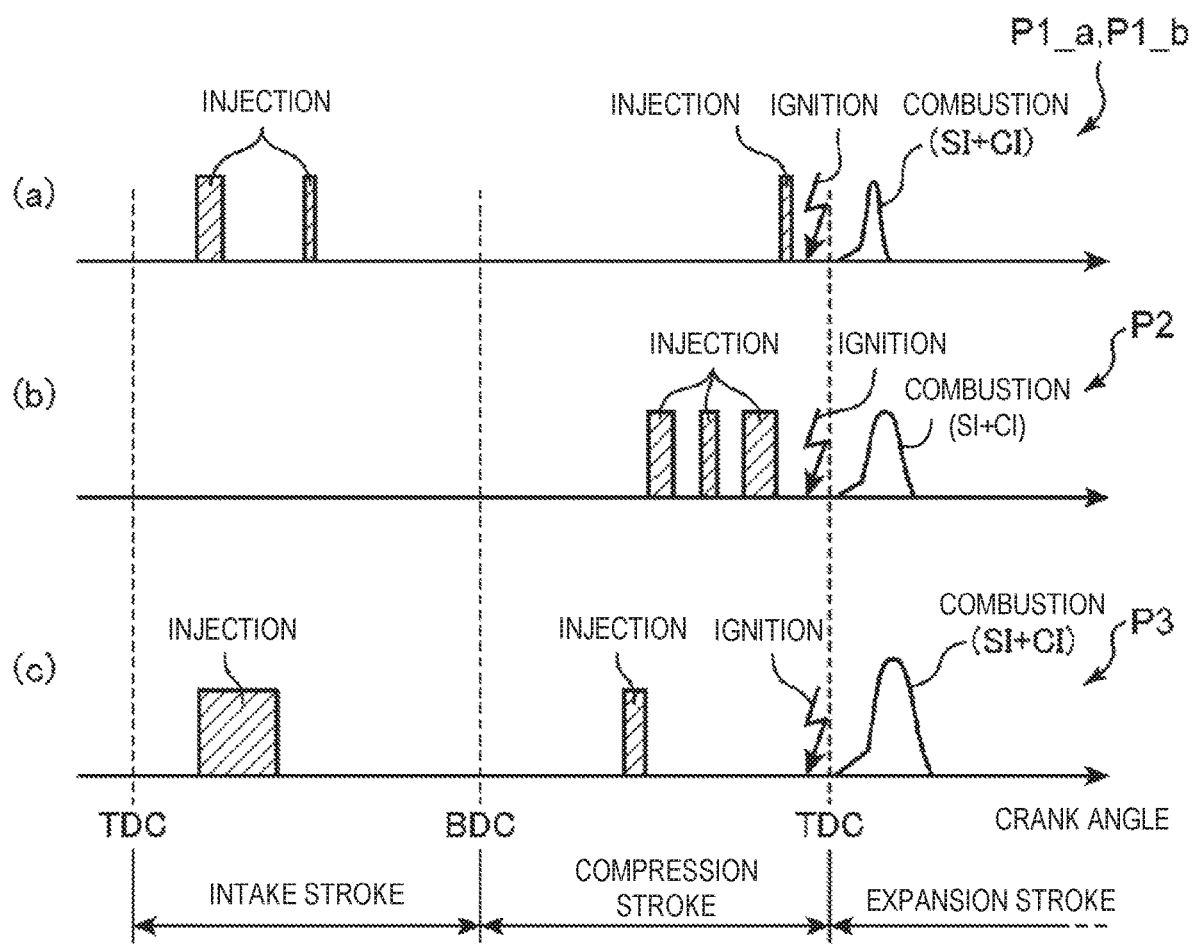
FIG. 8 shows time charts illustrating an injection pattern within a low-load first segment.

FIG. 8 is a chart illustrating the injection pulse of the injector 15, the ignition timing and the heat generation rate at the operation points within the first operating range A1. The width of the injection pulse (i.e., injection period) indicates the substantial injection amount and the injection amount is larger as the width of the injection pulse increases.

Part (a) of FIG. 8 illustrates an injection pattern of the fuel, etc. within an operation point P1_a where the engine speed is low in the low-load first segment A1_a and an operation point P1_b where the engine speed is low in the high-load first segment A1_b. That is, at an operation point where the engine speed is low within the first operating range A1, the fuel injection pattern and the ignition timing are fixed regardless of the engine load.

As illustrated in Part (a) of FIG. 8, at the operation points P1_a and P1_b, a total of three injections are performed in one cycle. A pre-injection Q1 which is performed first and a middle injection Q2 performed second are carried out from an early stage to an intermediate stage of the intake stroke. A post injection Q3 performed thirdly is carried out in a final stage of the compression stroke. In this specification, the early, intermediate, and final stages of a certain stroke mean respective stages when the certain stroke is divided into three stages.

As illustrated in Part (a) of FIG. 8, at the operation points P1_a and P1_b, a major portion of the fuel for one cycle is injected in the pre-injection Q1 and the remaining small amount of fuel is injected in the intermediate and post injections Q2 and Q3. That is, at the operation points P1_a and P1_b, a ratio of the injection amount of the pre-injection Q1 to the total amount of fuel to be injected in one cycle (hereinafter, simply referred to as "the ratio of the injection amount of the pre-injection Q1") is larger than a ratio of the injection amount of the middle injection Q2 to the total amount of fuel to be injected in one cycle (hereinafter, simply referred to as "the ratio of the injection amount of the middle injection Q2"), and a ratio of the injection amount of the post injection Q3 to the total amount of fuel to be injected in one cycle (hereinafter, simply referred to as "the ratio of the injection amount of the post injection Q3"). For example, the ratio of the injection amount of the pre-injection Q1 is about 80%, and the ratio of the injection amount of the middle injection Q2 and the ratio of the injection amount of the post injection Q3 are respectively about 10%.

The fuel injection amount in the pre-injection Q1 is at least 50% of the fuel to be injected into the combustion chamber 6 in one cycle.

Thus, at the operation points P1_a and P1_b, the timing when the fuel is injected into the combustion chamber 6, more specifically, a completion timing of the injection of 50% amount of the fuel into the combustion chamber 6 in one cycle, which is an average timing of the fuel injection into the combustion chamber 6 (hereinafter, suitably referred to as "the center timing of the fuel injection"), is a timing within the injection period of the pre-injection Q1 (a period during which the fuel is injected). That is, at the operation points P1_a and P1_b, the center timing of the fuel injection is a given timing within the injection period of the pre-injection Q1, on the intake stroke.

Part (b) of FIG. 8 illustrates an injection pattern of the fuel, etc. at an operation point P2 where the engine speed is high in the low-load first segment A1_a.

As illustrated in Part (b) of FIG. 8, at the operation point P2, similar to the operation point P1_a, a total of three injections are performed in one cycle. Note that at the operation point P2, different from the operation point P1_a, all the pre-injection Q1 performed firstly, the middle injection Q2 performed secondly, and the post injection Q3 performed thirdly are carried out from the intermediate stage to the final stage of the compression stroke. That is, at the operation point P2, all the fuel for one cycle is injected on the compression stroke. Thus, at the operation point P2, the center timing of the fuel injection is on the compression stroke.

As described above, at the operation point P1_a, the center timing of the fuel injection is on the intake stroke. Therefore, the center timing of the fuel injection at the operation point P2 is retarded than that at the operation point P1_a.

As illustrated in Part (b) of FIG. 8, at the operation point P2, the post injection Q3 contains a largest injection amount, and the injection amount of the pre-injection Q1 and the injection amount of the middle injection Q2 are substantially the same as each other. For example, the ratio of the injection amount of the post injection Q3 is about 45%, the ratio of the injection amount of the pre-injection Q1 is about 25%, and the ratio of the injection amount of the middle injection Q2 is about 30%.

As described above, at the operation point P1_a, a major portion of the fuel for one cycle is injected in the pre-injection Q1, and the ratio of the injection amount of the post injection Q3 is extremely small (e.g., about 10%). In this regard, at the operation point P2, the post injection Q3 contains a largest injection amount, and the ratio of the injection amount of the post injection Q3 is larger than that at the operation point P1_a.

Part (c) of FIG. 8 illustrates an injection pattern of the fuel, etc. within an operation point P3 where the engine speed is high in the high-load first segment A1_b.

As illustrated in Part (c) of FIG. 8, at the operation point P3, even within the same high-load first segment A1_b, different from the operation point P1_b where the engine speed is low, the post injection Q3 is not performed and a total of two injections are performed in one cycle. That is, at the operation point P3, only the pre-injection Q1 and the middle injection Q2 are performed.

Also at the operation point P3, similar to the operation point P1_b, the pre-injection Q1 performed firstly is carried out from the early stage to the intermediate stage of the intake stroke. On the other hand, at the operation point P3, different from the operation P1_b, the middle injection Q2 performed secondly is carried out from the intermediate stage to the final stage of the compression stroke.

As illustrated in Part (c) of FIG. 8, at the operation point P3, a major portion of the fuel for one cycle is injected in the pre-injection Q1 and the remaining small amount of fuel is injected in the middle injection Q2. That is, at the operation point P3, the ratio of the injection amount of the pre-injection Q1 is set larger than the ratios of the injection amounts of the intermediate and post injections Q2 and Q3. In this embodiment, as described above, at the operation point P3, the post injection Q3 is not performed and the ratio of the injection amount of the post injection Q3 is 0%. For example, the ratios of the injection amounts of the pre-injection Q1 and the middle injection Q2 are about 90% and 10%, respectively.

The fuel injection amount in the pre-injection Q1 is at least 50% of the fuel to be injected into the combustion chamber 6 in one cycle. Accordingly, at the operation point P3, the center timing of the fuel injection is in the injection period of the pre-injection Q1, i.e., a timing on the intake stroke.

(Relationship Between Engine Speed and Injection Pattern within Low-load First Segment A1_a)

(Injection Start Timing)

Figure 9:
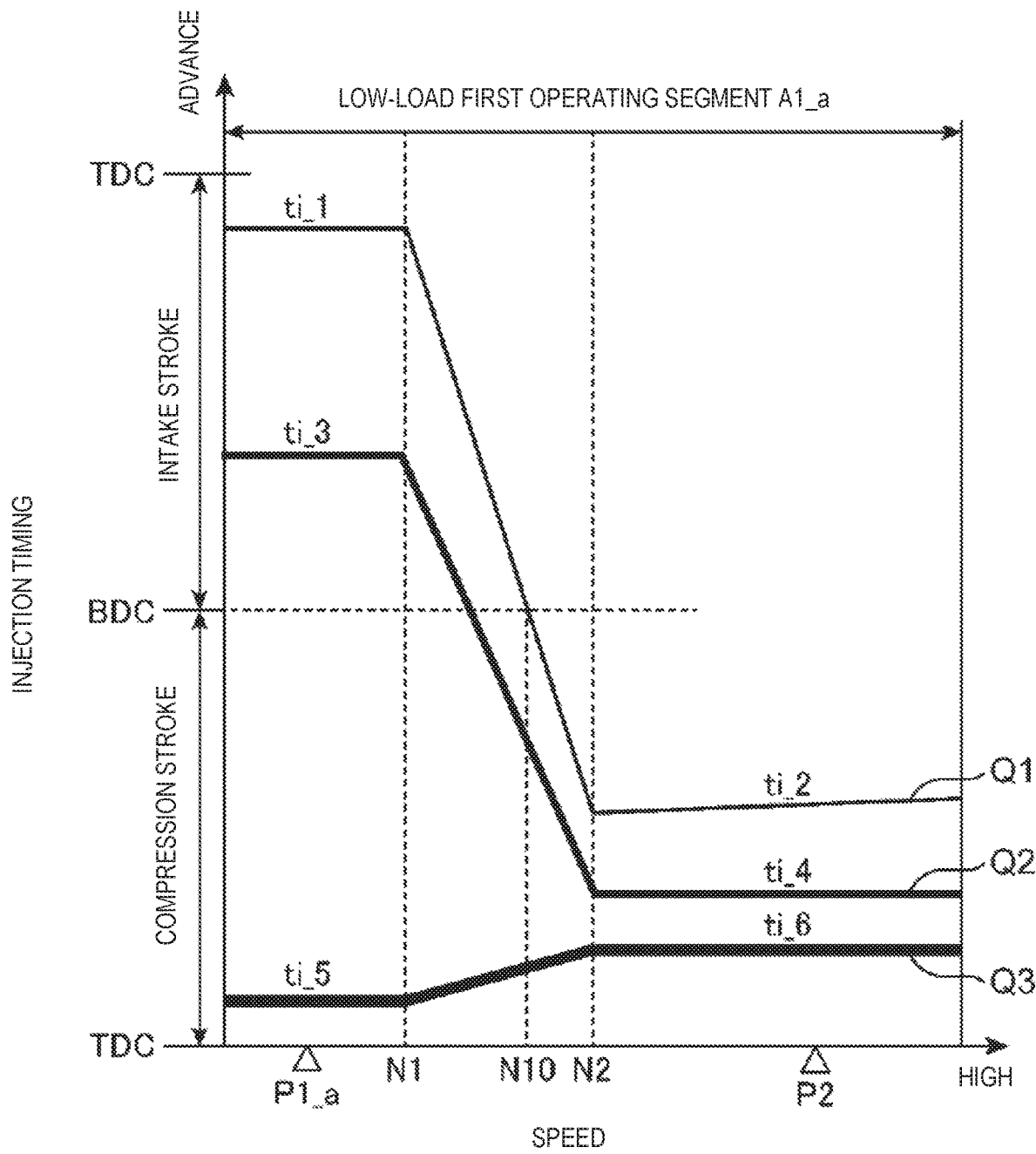
FIG. 9 is a chart illustrating a relationship between an engine speed and an injection start timing within a first operating range.

FIG. 9 is a chart illustrating a change in the injection start timing of each of the injections Q1, Q2, and Q3 in relation to the engine speed, in the low-speed first segment A1_a. FIG. 9 also illustrates the operation points P1_a and P2 described above.

As illustrated in FIG. 9, in the low-load first segment A1_a as a whole, the injection start timing of the pre-injection Q1 is set to retard as the engine speed increases.

Specifically, within an engine speed range below a first speed N1, the injection start timing of the pre-injection Q1 is set to a timing ti_1 on the intake stroke, fixed regardless of the engine speed. When the engine speed exceeds the first speed N1, the injection start timing of the pre-injection Q1 is gradually regarded from the timing ti_1 for when the engine speed is the first speed N1, as the engine speed increases. At an engine speed N10 between the first speed N1 and a second speed N2, the injection start timing of the pre-injection Q1 is the bottom dead center of the intake stroke (IBDC). Even when the engine speed exceeds the engine speed N10, the injection start timing of the pre-injection Q1 is gradually regarded as the engine speed increases. When the engine speed becomes the second speed N2, the injection start timing of the pre-injection Q1 is set to a timing ti_2 which is retarded than IBDC and is on the compression stroke. Within an engine speed range above the second speed N2, the injection start timing of the pre-injection Q1 is set to the timing ti_2 for when the engine speed is the second speed N2, fixed regardless the engine speed.

As illustrated in FIG. 9, in the low-load first segment A1_a, similar to the injection start timing of the pre-injection Q1, the injection start timing of the middle injection Q2 is set to retard as the engine speed increases.

Specifically, within the engine speed range below the first speed N1, the injection start timing of the middle injection Q2 is set to a timing ti_3 on the intake stroke, fixed regardless of the engine speed. When the engine speed exceeds the first speed N1, the injection start timing of the middle injection Q2 is gradually retarded from the timing ti_3 as the engine speed increases. Within the engine speed range above the second speed N2, the injection start timing of the middle injection Q2 is set to a timing ti_4 for when the engine speed is the second speed N2, fixed regardless of the engine speed (a timing retarded from the timing ti_3 for when the engine speed is the first speed N1). The injection start timing of the middle injection Q2 is also set to IBDC at an engine speed between the first speed N1 and the second speed N2, and when the engine speed is the second speed N2, the injection start timing of the middle injection Q2 is on the compression stroke.

On the other hand, as illustrated in FIG. 9, in the low-load first segment A1_a, the injection start timing of the post injection Q3 is set to advance as the engine speed increases.

Specifically, within the engine speed range below the first speed N1, the injection start timing of the post injection Q3 is set to a timing ti_5 on the compression stroke, fixed regardless of the engine speed. When the engine speed exceeds the first speed N1, the injection start timing of the post injection Q3 gradually advances from the timing ti_5 as the engine speed increases. Within the engine speed range above the second speed N2, the injection start timing of the post injection Q3 is set to the timing ti_6 for when the engine speed is the second speed N2, fixed regardless of the engine speed (a timing advanced from the timing ti_5 for when the engine speed is the first speed N1).

(Ratio of Injection Amount)

Figure 10:
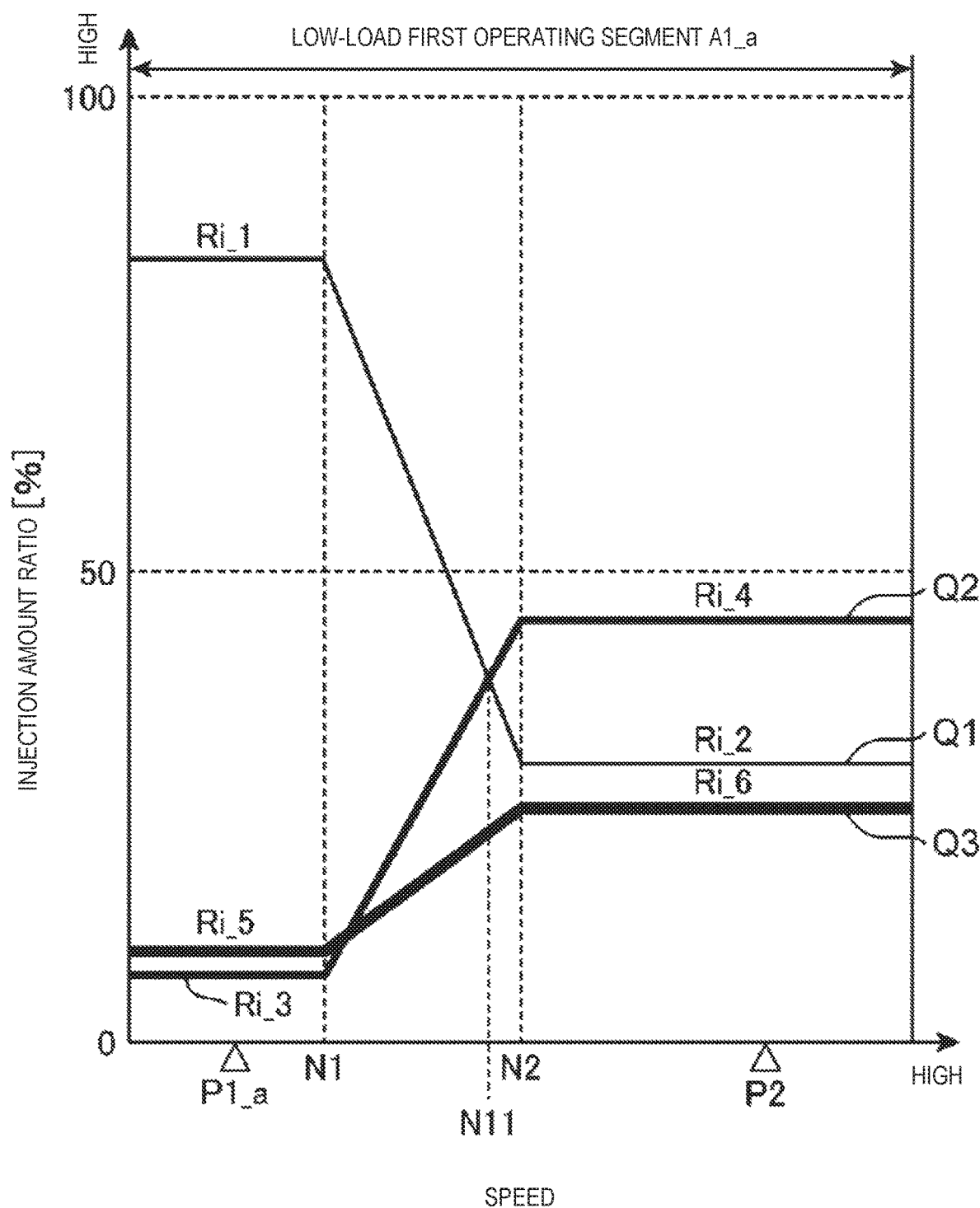
FIG. 10 is a chart illustrating a relationship between the engine speed and an injection ratio timing within the first operating range.

FIG. 10 is a chart illustrating a change in the ratio of the injection amount of each of the injections Q1, Q2, and Q3 in relation to the engine speed, in the low-load first segment A1_a.

As illustrated in FIG. 10, in the low-load first segment A1_a as a whole, the ratio of the injection amount of the pre-injection Q1 is set smaller as the engine speed increases.

Specifically, in the engine speed range below the first speed N1, the ratio of the injection amount of the pre-injection Q1 is fixed regardless of the engine speed and is set to a ratio Ri_1 close to 100%. When the engine speed exceeds the first speed N1, the ratio of the injection amount of the pre-injection Q1 gradually decreases from the ratio Ri_1 as the engine speed increases. Within the engine speed range above the second speed N2, the ratio of the injection amount of the pre-injection Q1 is a ratio Ri_2 for when the engine speed is the second speed N2, fixed regardless of the engine speed (a value smaller than the ratio Ri_1 for when the engine speed is the first speed N1). For example, as described above, the ratio Ri_1 of the injection amount of the pre-injection Q1 at the operation point P1_a when the engine speed is below the first speed N1 is about 80%, and the ratio Ri_2 of the injection amount of the pre-injection Q1 at the operation point P2 when the engine speed is above the second speed N2 is about 30%.

On the other hand, as illustrated in FIG. 10, in the low-load first segment A1_a as a whole, the ratio of the injection amount of the middle injection Q2 is set to be larger as the engine speed increases.

Specifically, in the engine speed range below the first speed N1, the ratio of the injection amount of the middle injection Q2 is fixed regardless of the engine speed and is set to a value Ri_3 close to 0. When the engine speed exceeds the first speed N1, the ratio of the injection amount of the middle injection Q2 gradually increases from the ratio Ri_3 as the engine speed increases. Within the engine speed range above the second speed N2, the ratio of the injection amount of the middle injection Q2 is a ratio Ri_4 for when the engine speed is the second speed N2, fixed regardless of the engine speed (a value larger than the ratio Ri_3 for when the engine speed is the first speed N1). For example, as described above, the ratio Ri_3 of the injection amount of the middle injection Q2 at the operation point P1_a when the engine speed is the first speed N1 is about 10%, and the ratio Ri_4 of the injection amount of the middle injection Q2 at the operation point P2 when the engine speed is higher than the second speed N2 is about 25%.

As illustrated in FIG. 10, in the low-load first segment A1_a as a whole, the ratio of the injection amount of the post injection Q3 is set larger as the engine speed increases.

Specifically, in the engine speed range below the first speed N1, the ratio of the injection amount of the post injection Q3 is fixed regardless of the engine speed and is set to a value Ri_5 close to 0. When the engine speed exceeds the first speed N1, the ratio of the injection amount of the post injection Q3 gradually increases from the ratio Ri5 as the engine speed increases. Within the engine speed range above the second speed N2, the ratio of the injection amount of the post injection Q3 is a ratio Ri_6 for when the engine speed is the second speed N2, fixed regardless of the engine speed (a value larger than the ratio Ri_5 for when the engine speed is the first speed N1). For example, as described above, the ratio Ri_5 of the injection amount of the post injection Q3 at the operation point P1_a when the engine speed is the first speed N1 is about 10%, and the ratio Ri_6 of the injection amount of the post injection Q3 at the operation point P2 when the engine speed is higher than the second speed N2 is about 45%.

Further, as illustrated in FIG. 10, in the low-load first segment A1_a, when the engine speed is lower than an intermediate speed N11 which is between the first speed N1 and the second speed N2, the ratio of the injection amount of the pre-injection Q1 has the largest value, and when the engine speed is higher than the intermediate speed N11, the ratio of the injection amount of the post injection Q2 has the largest value, among the values of Q1, Q2, and Q3.

By controlling the injection start timings and the injection amounts of the injections Q1, Q2, and Q3 as described above, in the low-load first segment A1_a, the center timing of the fuel injection is retarded as the engine speed increases.

(Relationship Between Engine Speed and Injection Pattern within High-load First Segment A1_b)

(Injection Start Timing)

Figure 11:
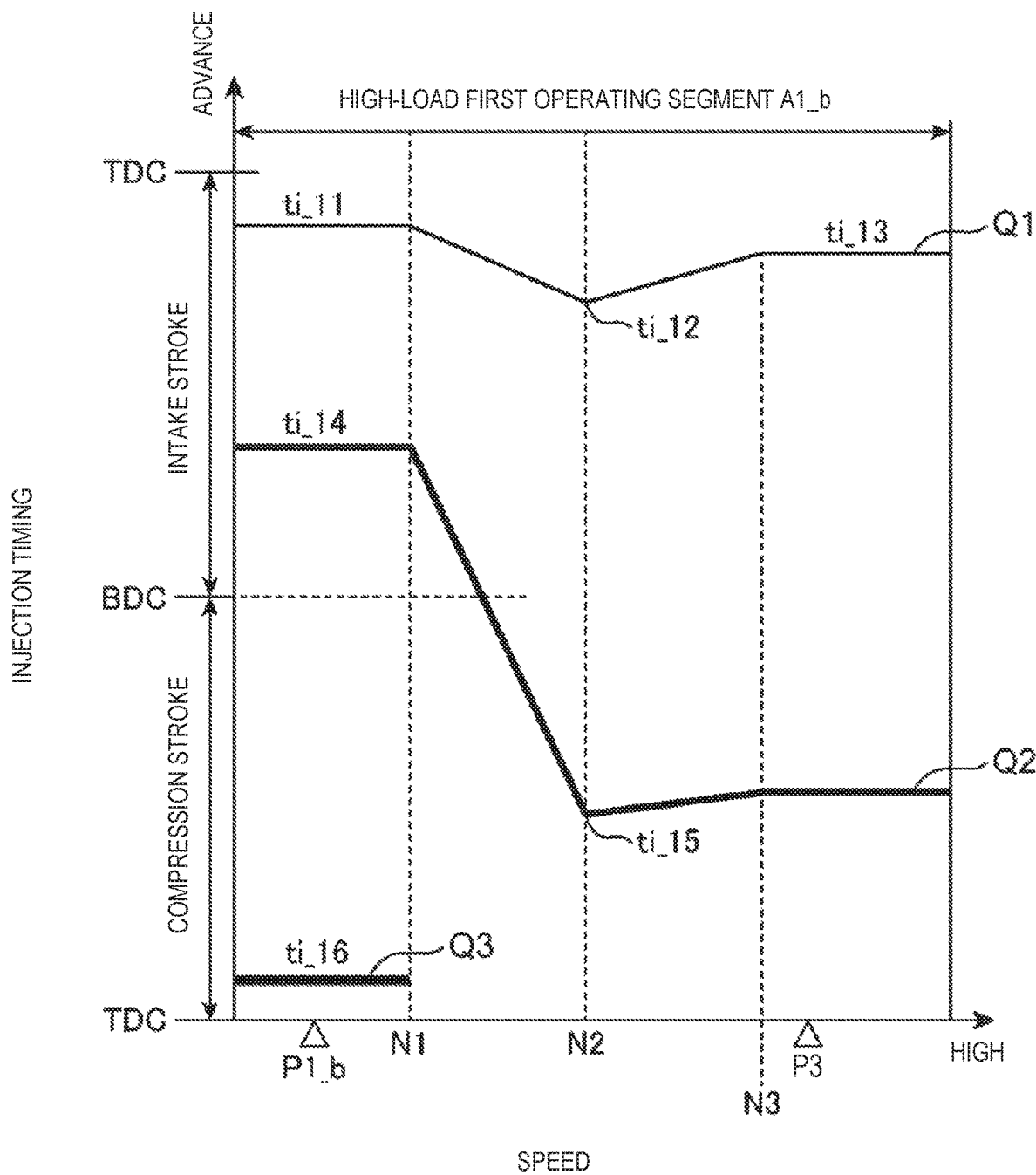
FIG. 11 is a chart illustrating a relationship between the engine speed and an injection start timing within the first operating range.

FIG. 11 is a chart illustrating a change in the injection start timing of each of the injections Q1, Q2, and Q3 in relation to the engine speed, in the high-load first segment A1_b.

As illustrated in FIG. 11, in the high-load first segment A1_b, as a whole, the injection start timing of the pre-injection Q1 is substantially fixed regardless of the engine speed.

Specifically, within an engine speed range below the first speed N1, the injection start timing of the pre-injection Q1 is set to a timing ti_11 on the intake stroke, fixed regardless of the engine speed. When the engine speed exceeds the first speed N1, the injection start timing of the pre-injection Q1 is gradually retarded as the engine speed increases, and in the engine speed range above the second speed N2, it is gradually advanced as the engine speed increases. When exceeding the third speed N3, which is greater than the second speed N2, the injection start timing of the pre-injection Q1 is set to a timing ti_13 fixed regardless of the engine speed. As described above, in the high-load first segment A1_b, the injection start timing of the pre-injection Q1 is set to be the most-retarded timing ti_12 (of the timings ti_11, ti_12, and ti_13 of the pre-injection Q1) when the engine speed is the second speed N2. Note that a difference between the injection start timing ti_11 of the pre-injection Q1 when the engine speed is the first speed N1 and the injection start timing ti_12 of the pre-injection Q1 at the second speed N2 is extremely small (e.g., this difference is 20° C.A or below), a difference between the injection start timing ti_13 of the pre-injection Q1 when the engine speed is the third speed N3 and the injection start timing ti_12 of the pre-injection Q1 at the second speed N2 is extremely small (e.g., this difference is 15° C.A or below), and in the high-load first segment A1_b, the injection start timing of the pre-injection Q1 is substantially fixed regardless of the engine speed. At least a change width of the injection start timing of the pre-injection Q1 in the high-load first segment A1_b with respect to the engine speed is sufficiently smaller than a change width of the injection start timing of the pre-injection Q1 in the low-load first segment A1_a with respect to the engine speed. Note that in this embodiment, as illustrated in FIG. 11, the injection start timing ti_13 of the pre-injection Q1 when the engine speed is the third speed N3 is slightly retarded from the injection start timing ti_11 of the pre-injection Q1 when the engine speed is lower than the first speed N1.

As illustrated in FIG. 11, in the high-load first segment A1_b as a whole, the injection start timing of the middle injection Q2 is set to retard as the engine speed increases.

Specifically, within the engine speed range below the first speed N1, the injection start timing of the middle injection Q2 is set to a timing ti_14 on the intake stroke, fixed regardless of the engine speed. When the engine speed exceeds the first speed N1, the injection start timing of the middle injection Q2 is gradually retarded from the timing ti_14 as the engine speed increases. Within the engine speed range above the second speed N2, the injection start timing of the middle injection Q2 is set near a timing ti_15 for when the engine speed is the second speed N2, substantially fixed regardless the engine speed (a timing retarded from the timing ti_14 for when the engine speed is the first speed N1). The injection start timing of the middle injection Q2 is set to IBDC at an engine speed between the first speed N1 and the second speed N2, and when the engine speed is the second speed N2, the injection start timing of the middle injection Q2 is on the compression stroke. Note that as illustrated in FIG. 11, in an engine speed range from the second speed N2 to the speed slightly higher than N2, the injection start timing of the middle injection Q2 is slightly advanced as the engine speed increases. Note that this advancing amount is extremely small, and in the engine speed range above the second speed N2, the injection start timing of the middle injection Q2 is substantially fixed regardless of the engine speed.

As described above, in the high-load first segment A1_b, the post injection Q3 is stopped when the engine speed is high. In this embodiment, when the engine speed exceeds the first speed N1, the post injection Q3 is stopped. In the high-load first segment A1_b and the engine speed range below the first speed N1, the injection start timing of the post injection Q3 is a timing ti_16 near CTDC, fixed regardless of the engine speed.

(Ratio of Injection Amount)

Figure 12:
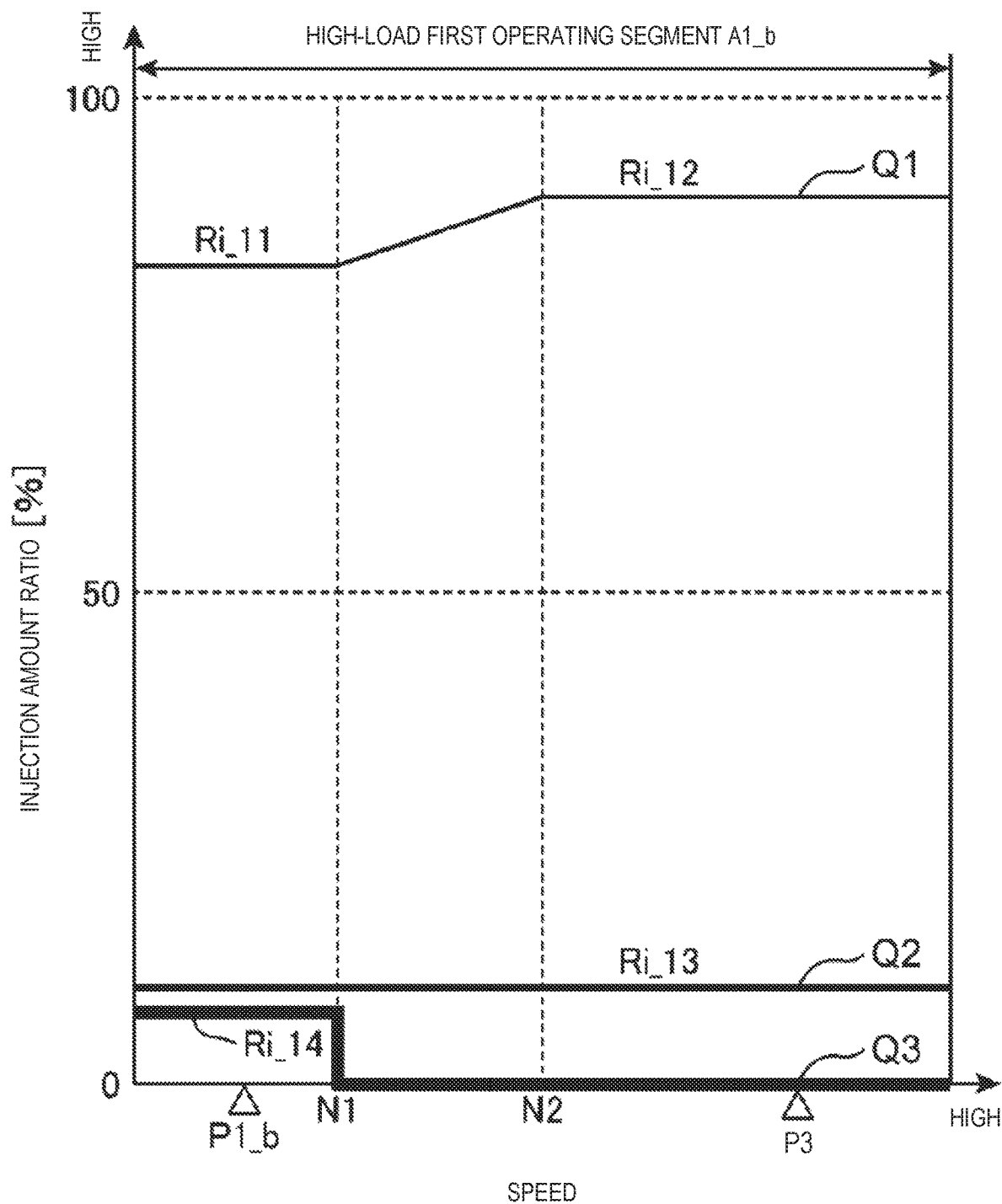
FIG. 12 is a chart illustrating a relationship between the engine speed and an injection ratio timing within the first operating range.

FIG. 12 is a chart illustrating a change in the ratio of the injection amount of each of the injections Q1, Q2, and Q3 in relation to the engine speed, in the high-load first segment A1_b.

As illustrated in FIG. 12, in the high-load first segment A1_b as a whole, the ratio of the injection amount of the pre-injection Q1 is set larger as the engine speed increases.

Specifically, in the engine speed range below the first speed N1, the ratio of the injection amount of the pre-injection Q1 is fixed regardless of the engine speed and is set to a ratio Ri_11 close to 100%. When the engine speed exceeds the first speed N1, the ratio of the injection amount of the pre-injection Q1 is gradually increased from the ratio Ri_11 as the engine speed increases. Within the engine speed range above the second speed N2, the ratio of the injection amount of the pre-injection Q1 is a ratio Ri_12 for when the engine speed is the second speed N2, fixed regardless of the engine speed (a value larger and closer to 100% than the ratio Ri_11 for when the engine speed is the first speed N1). For example, as described above, the ratio Ri_11 of the injection amount of the pre-injection Q1 at the operation point P1_b when the engine speed is below the first speed N1 is about 80%, and the ratio Ri_12 of the injection amount of the pre-injection Q1 at the operation point P3 when the engine speed is above the second speed N2 is about 90%.

On the other hand, as illustrated in FIG. 12, the ratio of the injection amount of the middle injection Q2 is constantly fixed at a value Ri_13 regardless of the engine speed in the high-load first segment A1_b. In the high-load first segment A1_b, the ratio of the injection amount of the pre-injection Q1 is constantly kept larger than that of the middle injection Q2 regardless of the engine speed.

Further, as illustrated in FIG. 12, in the high-load first segment A1_b, the ratio of the injection amount of the post injection Q3 is set smaller as the engine speed increases. That is, as described above, in the high-load first segment A1_b, the post injection Q3 is stopped when the engine speed exceeds the first speed N1, the ratio of the injection amount of the post injection Q3 when the engine speed is below the first speed N1 is set larger than 0% (e.g., about 10%), and the ratio of the injection amount of the post injection Q3 when the engine speed exceeds the first speed N1 is 0%.

(5) Swirl Control

Next, a swirl control within the first operating range A1 will be described in detail.

(5-1) Opening Setting of Swirl Valve

Figure 13:
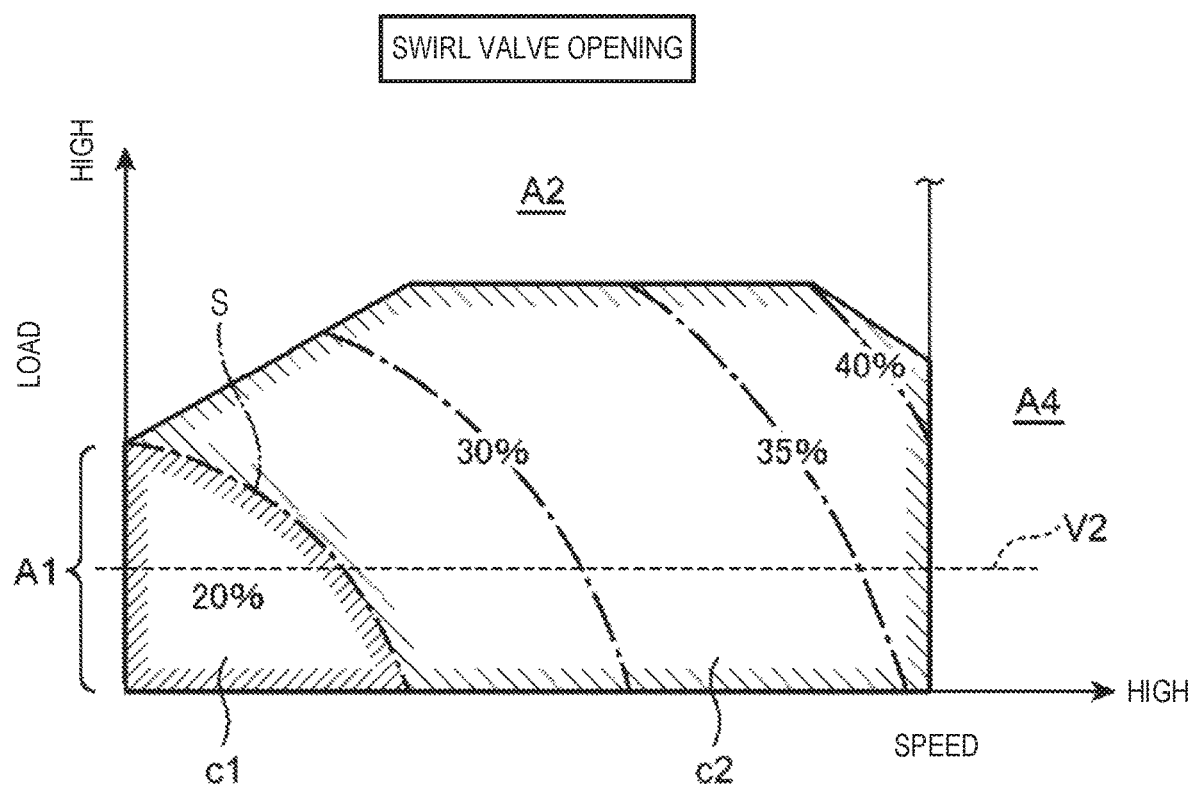
FIG. 13 is a map illustrating a specific example of a target swirl valve opening set within the first operating range.
Figure 14:
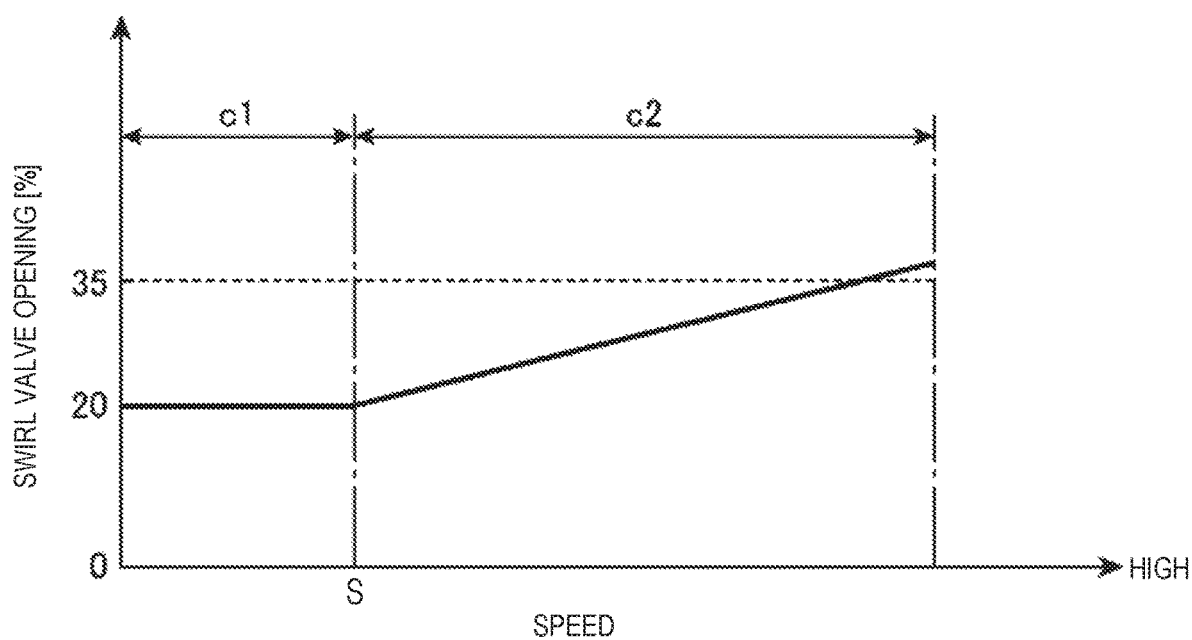
FIG. 14 is a chart illustrating a change in the target swirl valve opening when the engine speed is changed while the engine load is fixed.

FIG. 13 is a map illustrating a specific example of a target value of the opening of the swirl valve 18 set within the first operating range A1 (hereinafter, may be referred to as "target swirl valve opening"). FIG. 14 is a chart illustrating a change in the target swirl valve opening when the engine speed is changed while the engine load is fixed (along a line V2 of FIG. 13). As illustrated in FIGS. 13 and 14, within the first operating range A1, the target external EGR ratio is set to increase substantially between 20 and 40% as the engine speed or load is increased.

For example, the target swirl valve opening is uniformly set to 20% within a base segment c1 which is a lowest-speed, lowest-load segment within the first operating range A1, and is set to gradually increase as the engine speed or load increases within a main segment c2 where the engine speed or load is higher than the base segment c1. In the main segment c2, the target swirl valve opening approaches 20% as the engine speed and load decrease closer to the base segment c1, and is increased from 20% to approximately 40% at most as the engine speed and load increase to move away from the base segment c1. For example, when the engine speed increases to cross the base segment c1 and the main segment c2 in this order (along the line V2 of FIG. 13), as illustrated in FIG. 14, the target swirl valve opening is kept at 20% while the engine speed is within the base segment c1, and after shifting to the main segment c2, it is increased substantially at a fixed rate as the engine speed increases. In other words, in this embodiment, the change rate of the opening of the swirl valve 18 with respect to the engine speed (and thus a change rate of the intensity of the swirl flow) is set to increase as the engine speed increases. Here, a boundary speed S lies between the basic segment c1 and the main segment c2.

During the operation in the first operating range A1, the ECU 100 controls the opening of the swirl valve 18 according to the engine speed and load in accordance with the target swirl valve opening set as described above.

(5-2) Effect of Swirl Flow

The opening control of the swirl valve 18 as described above is performed in order to control the distribution of the mixture gas inside the combustion chamber 6 (adjust the fuel concentration difference) by using the swirl flow. That is, since the swirl flow swirling around the cylinder axis Z brings a relatively large amount of fuel to the center portion of the combustion chamber 6, by suitably adjusting the intensity of the swirl flow and the fuel injection start timing, a desired fuel concentration difference in the radial directions of the combustion chamber 6 can be generated. Hereinafter, the above-described effect of the swirl flow will be described in detail while showing the behavior of fuel (spray) when the fuel is injected on the intake stroke in a state where a sufficiently strong swirl flow is formed.

Figure 15:
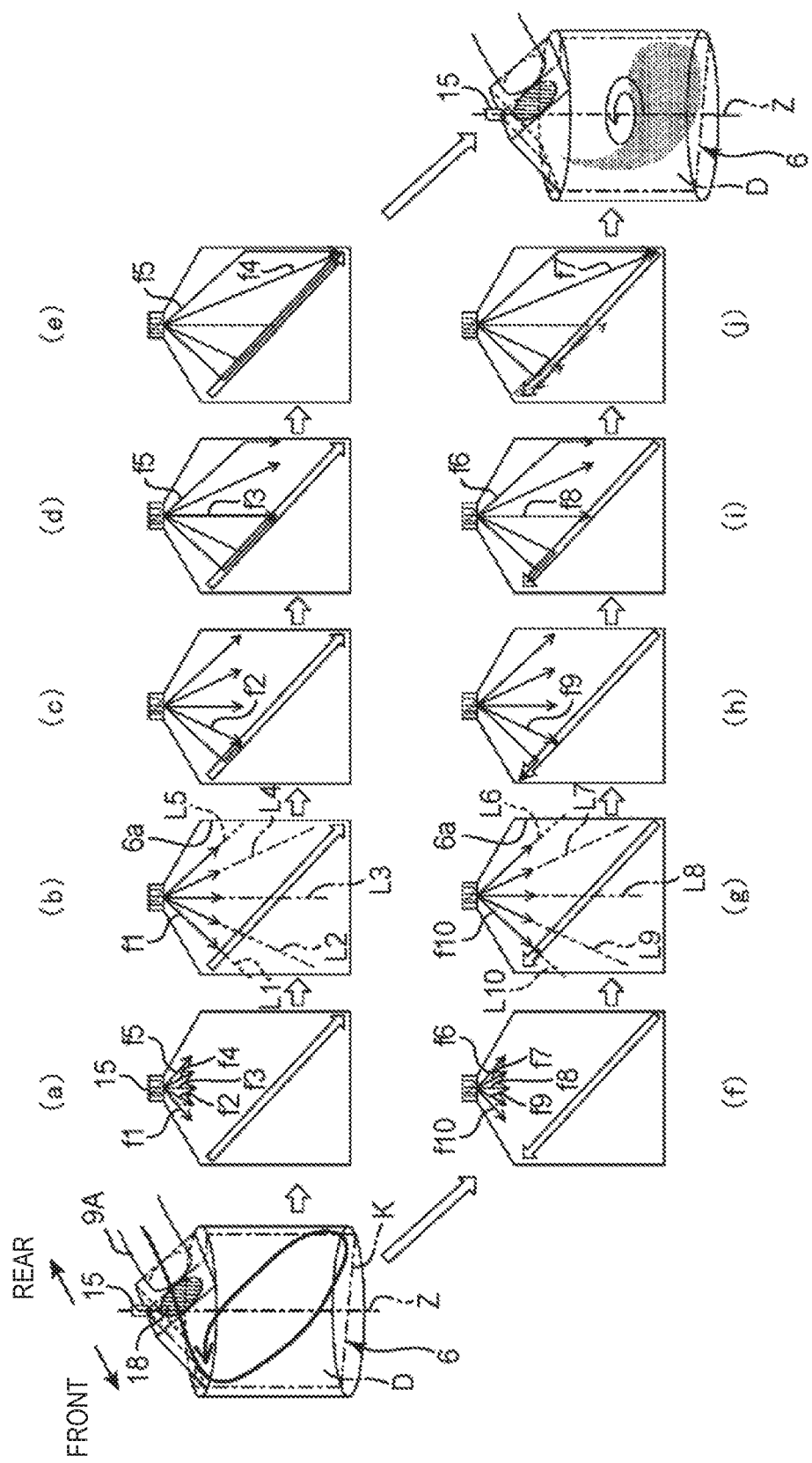
FIG. 15 shows diagrams illustrating a behavior of fuel (spray of fuel portions) injected by an injector, in relation to a swirl flow.

FIG. 15 shows diagrams illustrating the behavior of fuel (spray) injected by the injector 15, in relation to the swirl flow. The perspective view at the left end of FIG. 15 schematically shows a state of the combustion chamber 6 at a given timing on the intake stroke at which the volume of the combustion chamber 6 is relatively large. In FIG. 15, the swirl valve 18 is substantially closed. In this case, air is introduced into the combustion chamber 6 mainly from the first intake port 9A, and a strong swirl flow (lateral vortex) swirling around the cylinder axis Z is formed as indicated by an arrow in FIG. 15. This swirl flow is, as described before, an inclined swirl flow mixed with the tumble flow (vertical vortex).

Here, in a direction perpendicularly to the intake and exhaust directions, the side of the combustion chamber 6 at which the swirl valve 18 is provided (the second intake port 9B side) is a front side, the side where the swirl valve 18 is not provided (the first intake port 9A side) is a rear side. The swirl flow formed by closing the swirl valve 18 (that is, the inclined swirl flow) flows upwardly at the exhaust side of the combustion chamber 6 from the first intake port 9A, then passes a front section of the combustion chamber 6 obliquely downwardly while swirling in a large circle, and reaches a lower section at the intake side of the combustion chamber 6. Further, the swirl flow passes through a rear section of the combustion chamber 6 obliquely upwardly while swirling in a large circle, and returns to the upper section at the exhaust side of the combustion chamber 6.

A reference character D in the perspective view at the left end of FIG. 15 indicates a virtual plane bisecting an internal space of the combustion chamber 6 in the front and rear directions of the engine (directions perpendicularly to the intake and exhaust directions), and each of the schematic views (a) to (j) located on the right side of the perspective view indicates states of the front and rear sides of the combustion chamber 6 divided by the virtual plane D. For example, the five parts (a) to (e) in the upper part of FIG. 15 illustrate in a chronological order an influence of an upstream portion of the swirl flow flowing at the front side of the combustion chamber 6 on each spray of the fuel. Further, the five parts (f) to (j) in the lower part of FIG. 15 illustrate in a chronological order an influence of a downstream portion of the swirl flow flowing at the rear side of the combustion chamber 6 on each spray of the fuel.

The outlined arrows in Parts (a) to (j) of FIG. 15 show a main stream of the inclined swirl flow generated inside the combustion chamber 6 (a center portion of the flow with strong stream, hereinafter may simply be referred to as "the swirl flow"). Note that the main stream of the swirl flow has therearound a weak side stream flowing in the same direction as the main stream. Although the flow of the fuel spray may be influenced by the side stream, since the current direction of the side stream is the same as the main stream and also the main stream is more intense, even when the fuel spray is influenced by the side stream, the main stream has a dominant influence finally. Therefore, a later-described phenomenon in which the mixture gas distribution is formed by the swirl flow rarely changes due to the side stream.

First, the behavior of fuel injected to the front side of the combustion chamber 6 will be described. Part (a) of FIG. 15 illustrates the front side of the combustion chamber 6 immediately after the fuel is injected from the injector 15. Although this fuel injection simultaneously forms a spray of five fuel portions f1 to f5 at the front side of the combustion chamber 6, none of the spray has reached the swirl flow at this point. Note that in FIG. 15, the spray of the fuel portions f1 to f5 is illustrated as arrows along the center lines L1 to L5 of the respective fuel portions (see Part (b) of FIG. 15 and FIG. 2). Similarly, the spray of the fuel portions f6 to f10 described later is also illustrated as arrows along the center lines L6 to L10 of the respective fuel portions (see Part (g) of FIG. 15 and FIG. 2).

As illustrated in the Part (b) of FIG. 15, among all the fuel portions f1 to f5 at the front side, the fuel portion f1 injected from the nozzle port closest (having the shortest reach distance) to the swirl flow reaches the swirl flow first. Next, as illustrated in Part (c) of FIG. 15, the fuel portion f2 injected from the nozzle port having the second shortest reach distance reaches the swirl flow. The fuel portion f2 reaches the swirl flow on the downstream side of the position at which the fuel portion f1 precedingly reaches the swirl flow. On the other hand, the fuel portion f1 moves downstream together with the swirl flow. Therefore, when the fuel portion f2 reaches the swirl flow, it joins with the fuel portion f1 moving together with the swirl flow.

As illustrated Part (d) of FIG. 15, the fuel portion f3 injected from the nozzle port having the third shortest reach distance reaches the swirl flow on the downstream side of the position at which the fuel portion f2 reaches the swirl flow. Here, the fuel portion f3 joins with the fuel portions f1 and f2 that already joined to flow together with the swirl flow.

Next, as illustrated in Part (e) of FIG. 15, the fuel portion f4 injected from the nozzle port having the fourth shortest reach distance reaches the swirl flow. In this example, the fuel portion f4 reaches the swirl flow in a lower end section of the combustion chamber 6. Here, the fuel portion f4 joins with the fuel portions f1, f2, and f3 that already joined to flow together with the swirl flow.

Further, as illustrated in Part (d) of FIG. 15, the fuel portion f5 adjacent to the fuel portion f4 (closest to the intake side) reaches a wall surface 6a of the combustion chamber 6 first. As illustrated in Parts (d) and (e) of FIG. 15, the fuel portion f5 reached the wall surface 6a reaches the swirl flow by moving downward along the wall surface 6a. Here, the fuel portion f5 joins with the fuel portions f1, f2, f3, and f4 that already joined to flow together with the swirl flow.

As described above, in this embodiment, since the plurality of fuel portions (the spray of the fuel portions f1 to f5) are radially injected from the injector 15 to the front side of the combustion chamber 6 where the swirl flow is formed, the fuel portion which reaches the swirl flow first (e.g., the fuel portion f1) moves downstream along the swirl flow and then joins with another fuel portion (e.g., the fuel portion f2) which arrives following the swirl flow. In this embodiment, all the fuel (the fuel portions f1 to f5) injected from the injector 15 to the front side of the combustion chamber 6 join on the swirl flow by this mechanism. This leads to forming a rich mixture gas at a high fuel concentration.

Next, the behavior of the fuel injected to the rear side of the combustion chamber 6 will be described. Part (f) of FIG. 15 in the lower part illustrates a state of the rear side of the combustion chamber 6 immediately after the fuel is injected from the injector 15. Although this fuel injection simultaneously forms a spray of five fuel portions f6 to f10 at the rear side of the combustion chamber 6 (also simultaneously to the spray of the fuel portions f1 to f5 at the front side), none of the spray reaches the swirl flow at this point.

As illustrated in Part (g) of FIG. 15, among all the fuel portions f6 to f10 at the rear side, the fuel portion f10 injected from the nozzle port closest to the swirl flow reaches the swirl flow first. Next, as illustrated in Part (h) of FIG. 15, the fuel portion f9 injected from the nozzle port having the second shortest reach distance reaches the swirl flow. The fuel portion reaches the swirl flow on the upstream side of the position at which the fuel portion f10 precedingly reaches the swirl flow.

When the fuel portion f9 reaches the swirl flow, the fuel portion f10 that previously reached the swirl flow has already moved downstream together with the swirl flow to some extent. That is, the fuel portion f10 moves away from the fuel portion during the time between the arrival of the fuel portion f10 at the swirl flow and the arrival of the fuel portion at the swirl flow thereafter, and does not join with the fuel portion f9. After the fuel portion f9 reaches the swirl flow, the fuel portion f9 moves downstream together with the swirl flow, while the fuel portion f10 moves even further downstream. Therefore, in either case the fuel portion f9 does not join with the fuel portion f10. In this manner, the fuel portions f9 and f10 move along the swirl flow while staying separated from each other.

Next, as illustrated in Part (i) of FIG. 15, the fuel portion f8 injected from the nozzle port at the third shortest reach distance reaches the swirl flow on the upstream side of the position at which the fuel portion reaches the swirl flow. Here, since the fuel portions and f10 which precedingly reach the swirl flow move downstream together with the swirl flow, these fuel portions f9 and f10 do not join with the fuel portion f8.

As described above, in this embodiment, since the plurality of fuel portions (the spray of the fuel portions f8 to f10) are radially injected from the injector 15 to the rear side of the combustion chamber 6 where the swirl flow is formed, the fuel portion which reaches the swirl flow first (e.g., the fuel portion f10) does not join with the fuel portions that reach the swirl flow later (e.g., the fuel portions f8 and f9) which arrive following the swirl flow. In this embodiment, approximately 30% of the fuel injected by the injector 15 diffuses, which leads to forming a homogeneous mixture gas with the fuel spreading widely and thin.

In the fuel injected to the rear side of the combustion chamber 6 (the fuel portions f6 to f10), the fuel other than the fuel portions f8 to f10 separated from each other, that is, the fuel portions f6 and f7, join with the fuel portions f1 to f5 injected to the front side of the combustion chamber 6.

For example, among the fuel portions f6 to f10 at the rear side, the fuel portion f7 injected from the nozzle port at the fourth shortest reach distance reaches the swirl flow in the lower end portion of the combustion chamber 6 as illustrated in Part (j) of FIG. 15. In the lower end portion of the combustion chamber 6, since the fuel portions f1 to f5 at the front side join together by the mechanism described above (see Part (e) of FIG. 15), the fuel portion f7 joins with the fuel portions f1 to f5 which join precedingly.

As illustrated in Part (i) of FIG. 15, the fuel portion f6 adjacent to the fuel portion f7 (closest to the intake side) reaches the wall surface 6a of the combustion chamber 6 first. As illustrated in Parts (i) and (j) of FIG. 15, the fuel portion f6 reached the wall surface 6a reaches the swirl flow by moving downward along the wall surface 6a. Here, the fuel portion f6 joins with the fuel portion f7 and the fuel portions f1 to f5 at the front side. Thus, in this embodiment, approximately 70% of the fuel injected by the injector 15 joins together.

The perspective view at the right end of FIG. 15 schematically illustrates a state of the combustion chamber 6 immediately after all the fuel (the fuel portions f1 to f10) injected from the injector 15 reach the swirl flow. As illustrated in this figure, in this embodiment where a major portion (70%) of the fuel injected from the injector 15 joins together on the swirl flow, the (rich) mixture gas at a sufficiently high fuel concentration is formed along the swirl flow. The rich mixture gas gradually moves toward the center of the combustion chamber 6 while moving circumferentially within the combustion chamber 6 together with the swirl flow.

Figure 16:
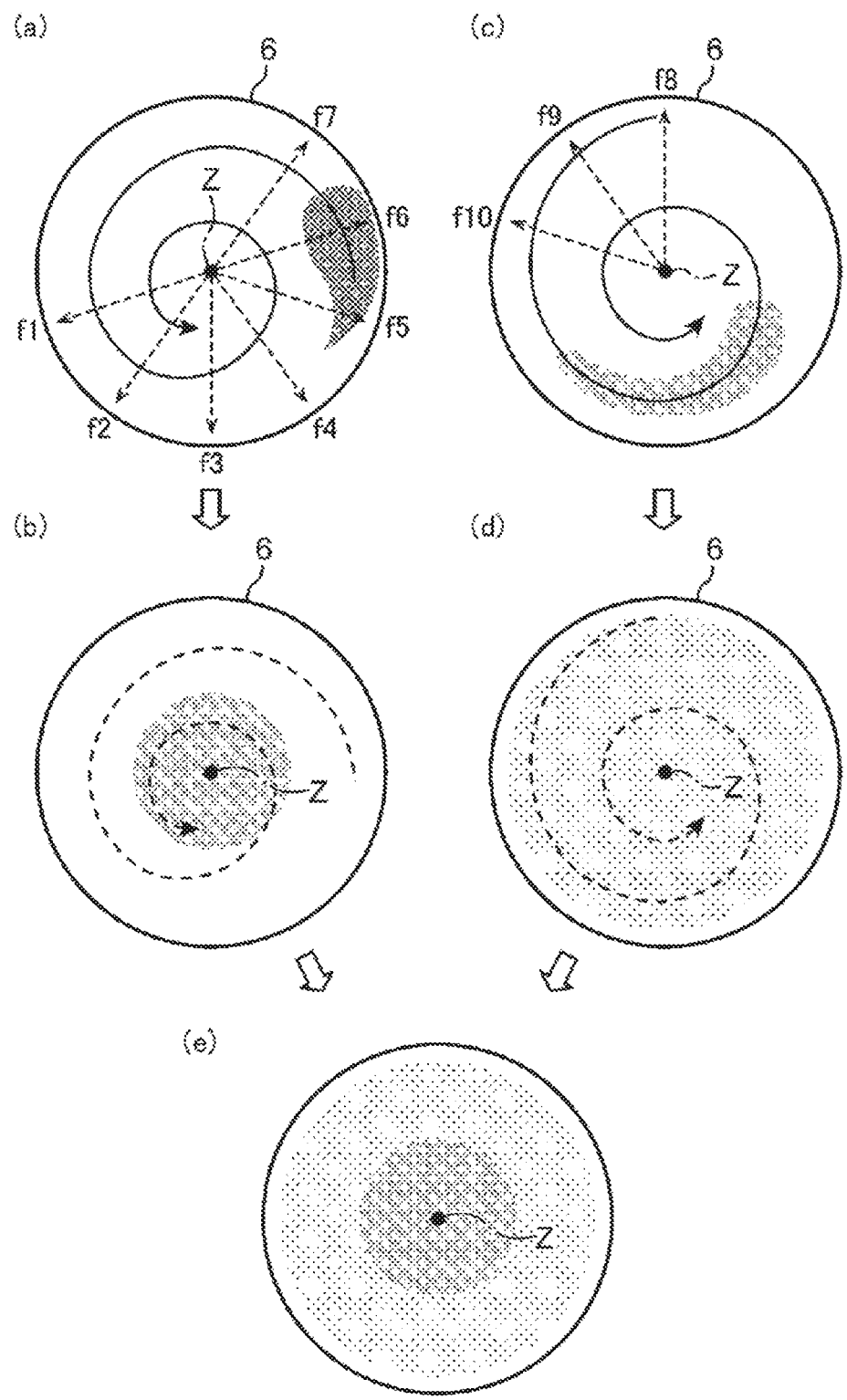
FIG. 16 shows diagrams illustrating a mixture gas moving with the swirl flow within the combustion chamber seen from above.

FIG. 16 shows diagrams illustrating the mixture gas moving with the swirl flow within the combustion chamber 6 seen from above. As illustrated in the figure, the swirl flow formed inside the combustion chamber 6 grows sufficiently as the intake stroke progresses, then attenuates by receiving air resistance, and moves toward the center of the combustion chamber 6 while gradually diffusing.

Part (a) of FIG. 16 illustrates a state where the spray of the fuel portions f1 to f7 joins together to form a rich mixture gas (areas with fine dots). As indicated by the arrows in this drawing, this rich mixture gas moves together with the swirl flow which changes as described above, and thus moves toward the center of the combustion chamber 6 while gradually diffusing. As a result, as illustrated in Part (b) of FIG. 16, the relatively rich mixture gas is unevenly distributed in the center portion of the combustion chamber 6 immediately before the combustion starts.

Part (c) of FIG. 16 illustrates a state where (lean) mixture gas at a low fuel concentration is formed by the fuel portions f8 to f10 which do not join with each other. As indicated by the arrows in the drawing, this lean mixture gas moves together with the swirl flow to move toward the center of the combustion chamber 6 while sufficiently diffusing. Thus, as illustrated in Part (d) of FIG. 16, immediately before the combustion starts, relatively lean mixture gas spreading in the entire combustion chamber 6 is formed.

Part (e) of FIG. 16 illustrates a state where the mixture gas illustrated in Parts (b) and (d) are superimposed. As illustrated in this figure, the mixture gas formed by the fuel portions f1 to f7 joined together (Part (b) of FIG. 16), is mixed with the mixture gas formed by the diffusing fuel portions f8 to f10 (Part (d) of FIG. 16), and thus a stratified mixture gas in which the fuel concentration is higher in the center portion than in the outer circumferential portion is formed in the combustion chamber 6. That is, the rich mixture gas with relatively high fuel concentration is formed in the center portion of the combustion chamber 6 and the lean mixture gas with relatively low fuel concentration is formed in the outer circumferential portion of the combustion chamber 6.

With the effect of the swirl flow as described above, even when the fuel is injected at a relatively early timing of the intake stroke, the mixture gas at the timing of spark ignition (at the start of the SPCCI combustion) is stratified to some extent, which means that relatively rich mixture gas is formed in the center portion of the combustion chamber 6. Such stratification of the mixture gas becomes more obvious as the swirl flow is enhanced.

For example, at the operation point P1_a of the first operating range A1, the major portion of the fuel is injected on the intake stroke as described above (see Part (a) of FIG. 8). However, at a point at which the engine speed and load are sufficiently low as at the operation point P1, since the swirl valve 18 is set to have the lowest opening (20%) and a sufficiently strong swirl flow is formed as illustrated in FIG. 8, even when the major portion of the fuel is injected on the intake stroke as described above, the fuel distribution is not made even and the fuel concentration in the center portion of the combustion chamber 6 becomes higher than in the outer circumferential portion. Moreover, at the operation point P1_a, since additional fuel is injected in the final stage of the compression stroke, this injected fuel is added to the center portion of the combustion chamber 6, resulting in more obvious stratification of the mixture gas. As a result, at the operation point P1_a, sufficiently stratified mixture gas is formed in which A/F is between 20:1 and 30:1 in the center portion and 35:1 or larger in the outer circumferential portion. Such stratification of the mixture gas acts advantageously on the growth of the flame after the spark ignition. That is, while the spark ignition by the spark plug 16 acts on the mixture gas in the center portion of the combustion chamber 6 to form a flame core, since the A/F in the center portion is relatively rich as described above, the growth of the flame core is stimulated and the progression of subsequent combustion is stabilized.

(6) About SI Ratio

As described above, in this embodiment the SPCCI combustion combined the SI combustion and the CI combustion is performed within the first and second operating ranges A1 and A2. In this SPCCI combustion, it is important to control the ratio of the SI combustion with the CI combustion according to the operating condition.

In this embodiment, as this ratio, an SI ratio which is a ratio of a heat generation amount by the SI combustion to the total heat generation amount by the SPCCI combustion (the SI combustion and the CI combustion) is used. The flection point X in the waveform of FIG. 6 is a flection point appearing when the combustion mode switches from the SI combustion to the CI combustion and the crank angle $\theta ci$ corresponding to this flection point X may be defined as the start timing of CI combustion. Further, an area R1 of the waveform of the heat generation rate located on the advance side of this $\theta ci$ (the start timing of CI combustion) is set as the heat generation amount by the SI combustion, and an area R2 of the waveform of the heat generation rate located on the retarding side of $\theta ci$ is the heat generation rate by the CI combustion. Thus, the SI ratio defined by (heat generation amount by SI combustion)/(heat generation amount by SPCCI combustion) may be expressed by R1/(R1+R2) using the respective areas R1 and R2. That is, in this embodiment, the SI ratio=R1/(R1+R2).

In the case of CI combustion, since the mixture gas combusts a plurality of times simultaneously by self-ignition, the heat generation rate easily increases compared to the SI combustion which is caused by flame propagation, and loud noise easily occurs. Therefore, as a whole, the SI ratio (=R1/(R1+R2)) in the SPCCI combustion is desirably increased as the engine load increases. This is because, when the load is high, the fuel injection amount is larger and the total heat generation amount in the combustion chamber 6 is larger compared to when the load is low, and therefore, loud noise is generated if the SI ratio is reduced (that is, the proportion of CI combustion is increased). Conversely, the CI combustion is excellent in terms of thermal efficiency. Therefore, it is preferable to apply the CI combustion to the largest fuel amount possible unless the noise becomes an issue. Therefore, as a whole, the SI ratio in the SPCCI combustion is desirably reduced as the engine load decreases (i.e., the proportion of the CI combustion is increased). In view of these points, in this embodiment, the SI ratio aimed for (target SI ratio) is determined in advance so that the SI ratio increases as the engine load becomes higher (in other words, the SI ratio decreases as the engine load becomes lower). Accordingly, in this embodiment, a target $\theta ci$ which is a start timing of the CI combustion when the combustion conforming to this target SI ratio is performed is also determined in advance for each operating condition of the engine.

In order to achieve the target SI ratio and the target $\theta ci$, the control amounts, such as the ignition timing, the fuel injection amount and injection start timing, and the EGR ratio (the external EGR ratio and the internal EGR ratio), need to be adjusted for each operating condition. For example, as the ignition timing is advanced, a larger amount of fuel is combusted in the SI combustion, and the SI ratio increases. Further, as the injection start timing of the fuel is advanced, a larger amount of fuel is combusted in the CI combustion, and the SI ratio decreases. Alternatively, as the temperature of the combustion chamber 6 rises according to the increase of the EGR ratio, a larger amount of fuel is combusted in the CI combustion, and the SI ratio decreases. Moreover, since a change in the SI ratio is followed by a change in the $\theta ci$, changes in these control amounts (the ignition timing, the injection start timing, the EGR ratio, etc.) are elements for adjusting the $\theta ci$.

Based on such a tendency, in this embodiment, the target values of the ignition timing, the fuel injection amount and injection start timing, the external EGR ratio, the valve operation timings (and thus the internal EGR ratio), etc. are determined in advance for each operating condition so as to achieve a value combination achievable of the target SI ratio and the target $\theta ci$ described above. In the operation with the SPCCI combustion (i.e., in the operation within the first and second operating ranges A1 and A2), the ECU 100 controls the injector 15, the spark plug 16, the EGR valve 53, the intake and exhaust VVTs 13a and 14a, etc. based on the target values of these control amounts. For example, the spark plug 16 is controlled based on the target value of the ignition timing and the injector 15 is controlled based on the target values of the fuel injection amount and injection start timing. Further, the EGR valve 53 and the intake and exhaust VVTs 13a and 14a are controlled based on the respective target values of the external EGR ratio in the combustion chamber 6 and the valve operation timings (internal EGR ratio), and the recirculation amount of exhaust gas (external EGR gas) through the EGR passage 51 and the residual amount of burned gas (internal EGR gas) by the internal EGR are adjusted.

(7) Control Based on Target $\theta ci$

As described above, in this embodiment, the target values of the control amounts, such as the ignition timing, the fuel injection amount and injection start timing, and the EGR ratio, are determined in advance so that the SI ratio and $\theta ci$ match their respective target values (the target SI ratio and the target $\theta ci$); however, controlling the control amounts (the ignition timing, etc.) to the target values do not guarantee to achieve the target SI ratio and the target $\theta ci$. Therefore, in this embodiment, the start timing of the CI combustion, $\theta ci$, is identified for each combustion cycle and the ignition timing is adjusted based on the identified $\theta ci$.

Figure 17:
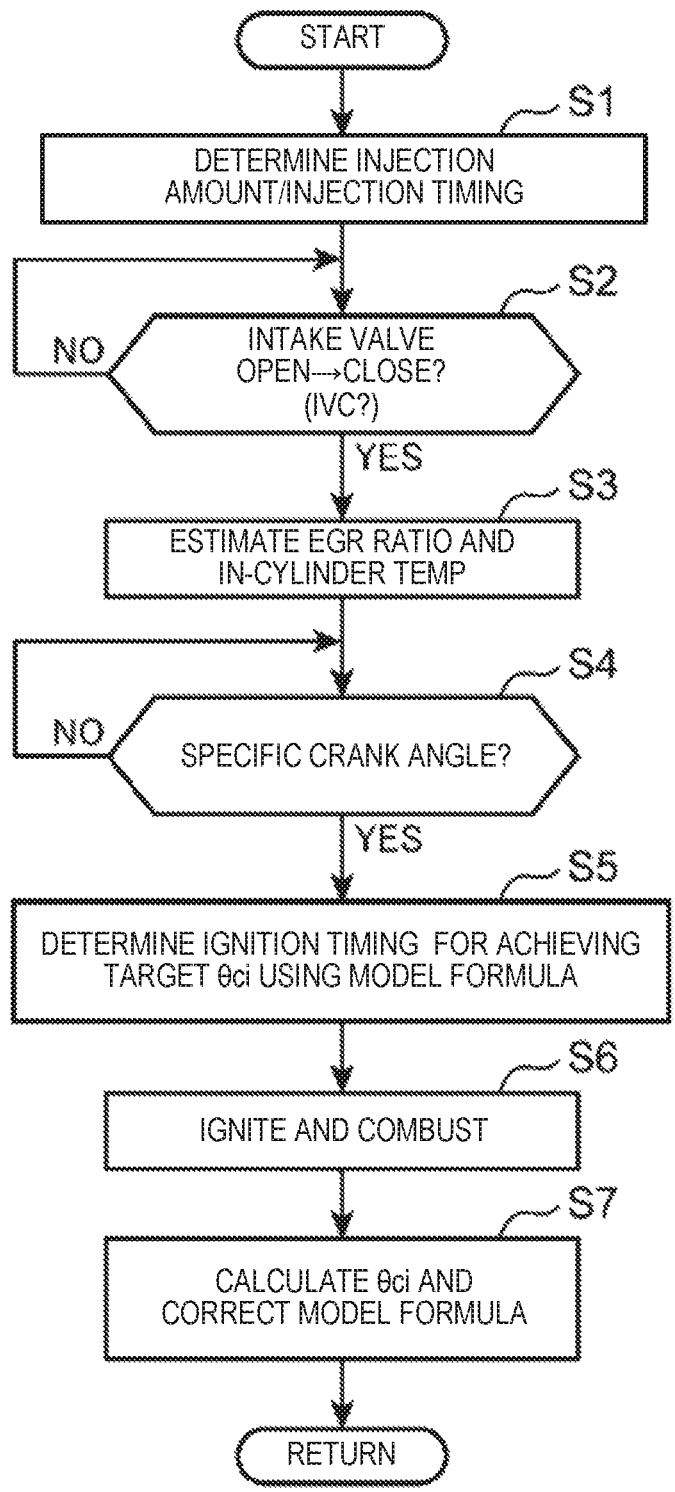
FIG. 17 is a flowchart illustrating details of a control executed during SPCCI combustion.

FIG. 17 is a flowchart illustrating details of the control executed by the ECU 100 in the SPCCI combustion, that is, in the operation within the first and second operating ranges A1 and A2 illustrated in FIG. 5. When the control illustrated in this flowchart starts, at S1, the ECU 100 determines the fuel injection amount from the injector 15 and its injection start timing based on the engine speed detected by the crank angle sensor SN1 and the engine load identified by the detection value of the accelerator sensor SN9 (accelerator opening), the detection value of the airflow sensor SN3 (intake flow rate), etc. Note that the injection amount and injection start timing of the fuel determined here are the injection amount and injection start timing defined in advance for each operating condition of the engine so that the target θci is achieved.

Next, the ECU 100 shifts to S2 to determine whether the intake valve 11 is closed (switched from "open" to "closed"). In this embodiment, since the valve operation timing is determined in advance for each engine operating condition, IVC is also known in advance for each operating condition. The ECU 100 determines whether IVC determined for each operating condition has passed based on the detection value of the crank angle sensor SN1, and determines that the intake valve 11 is closed when determined that IVC has passed.

If S2 is YES and it is confirmed that the intake valve 11 is closed, the ECU 100 shifts to S3 to estimate the EGR ratio and the in-cylinder temperature (the internal temperature of the combustion chamber 6). For example, the ECU 100 estimates the EGR ratio (the external EGR ratio and the internal EGR ratio) based on various parameters including the in-cylinder pressure detected by the in-cylinder pressure sensor SN2 when the intake valve 11 is closed (that is, IVC), the flow rate of the intake air (fresh air) detected by the air flow sensor SN3 before IVC, and the pressure difference between upstream and downstream of the EGR valve 53 detected by the pressure difference sensor SN8 before IVC. Further, the in-cylinder temperature is estimated based on the estimated EGR ratio and the detection value detected by the second intake temperature sensor SN6.

Note that as described above, in this embodiment, the respective target values of the external EGR ratio and the valve operation timing (internal EGR ratio) are determined in advance, and the opening of the EGR valve 53 and the intake and exhaust VVTs 13a and 14a are accordingly controlled. However, the actual external EGR ratio and the internal EGR ratio can be thought to vary in different circumstances, and such EGR ratio fluctuation or the accompanying variation in the in-cylinder temperature influence the start timing of the CI combustion (θci) and the SI ratio. Therefore, in order to adjust the ignition timing considering such influence, in this embodiment, at S3 the actual EGR ratio and the in-cylinder temperature are estimated for each combustion cycle.

Next, the ECU 100 shifts to S4 to determine whether the current crank angle is a specific crank angle based on the detection value of the crank angle sensor SN1. This specific crank angle is determined in advance as the timing for determining the ignition timing by the spark plug 16, and determined to be a suitable timing from IVC to CTDC (e.g., about 60° C.A before CTDC).

If S4 is YES and it is confirmed that the current crank angle is the specific crank angle, the ECU 100 shifts to S5 to determine the ignition timing for achieving the target θci.

For example, at S5, the ECU 100 determines the ignition timing for achieving the target θci based on an initial target value of the ignition timing determined corresponding to the target θci (hereinafter, referred to as "default ignition timing") and the estimated values of the EGR ratio and the in-cylinder temperature obtained at S3.

In this embodiment, in order to determine the ignition timing, a model formula is prepared in advance for determining a correction amount of the ignition timing based on the estimated EGR ratio and in-cylinder temperature. For example, the ignition timing needs to be deviated greater from the default ignition timing as the estimated EGR ratio and in-cylinder temperature deviate greater from their target values. On the other hand, in this embodiment, since the initial target values are adopted as they are as the fuel injection amount and injection start timing as described at S1, the deviations in the fuel injection amount and injection start timing from the target values are not required to be taken into consideration. Therefore, in this embodiment, an arithmetic formula having the deviation amounts of the EGR ratio and in-cylinder temperature from the target values as an input element and the correction amount of the ignition timing as an output element is prepared in advance as the model formula. In other words, by inputting the deviation amounts of the EGR ratio and in-cylinder temperature from the target values into the model formula, the correction amount of the ignition timing required to match θci with the target θci (the correction amount from the default ignition timing) is obtained. At S5, a timing retarded or advanced from the default ignition timing by the correction amount calculated based on the model formula is determined as the final ignition timing. Note that when the EGR ratio and in-cylinder temperature estimated at S3 are the same as the target values, the default ignition timing is adopted as the ignition timing as it is.

Next, the ECU 100 shifts to S6 to cause the spark plug 16 to ignite at the ignition timing determined at S5, so as to trigger the SPCCI combustion of the mixture gas.

Next, the ECU 100 shifts to S7 to calculate θci (the start timing of the CI combustion) based on the in-cylinder pressure detected over a given period overlapping with the combustion period of the SPCCI combustion (the period from the start until the end of combustion), and correct the model formula used at S5 based on the calculated θci. That is, the ECU 100 calculates a heat generation rate accompanying the combustion for each crank angle based on the waveform of the in-cylinder pressure detected by the in-cylinder pressure sensor SN2 during the given period, and the timing when the SI combustion is switched to the CI combustion (the timing corresponding to the flection point X of FIG. 6) is identified as θci based on the data of the heat generation rate for each crank angle. Further, a deviation amount between this identified θci and the target θci is calculated and, based on this calculated deviation amount, the model formula for determining the ignition timing (the ignition timing for achieving the target θci) is corrected. This correction of the model formula leads to an improvement of accuracy in determining the ignition timing next time in a similar condition.

(8) Operations and Effects

As described above, in this embodiment, in the low-load first segment A1_a of the first operating range A1 where the SPCCI combustion is performed in the A/F lean environment, the center timing of the fuel injection is retarded as the engine speed increases. Therefore, there is an advantage in that high combustibility is ensured regardless of the engine speed.

That is, since the moving speed of the piston 5 is higher as the engine speed increases, the combustion chamber 6 sharply expands after the spark ignition, and as a result, the growth of the flame core is easily interrupted. On the other hand, in this embodiment, at the high speed side in the low-load first segment A1_a, the center timing of the fuel injection is retarded and a larger amount of fuel is injected into the combustion mode 6 at a timing near CTDC. Therefore, at the ignition timing near CTDC, the mixture gas having the high fuel concentration is formed in a part of the combustion chamber 6 more reliably. Thus, the SI combustion progresses stably and the subsequent CI combustion is surely started, which avoids the start timing of the CI combustion (θci) from greatly varying between cycles. As described above, according to this embodiment, stable SPCCI combustion is achieved regardless of the engine speed.

For example, in this embodiment, the fuel injected on the intake stroke by the swirl flow is gathered in the center portion of the combustion chamber. However, as described above, the swirl flow grows as the intake stroke progresses, then attenuates due to air resistance, and gradually diffuses. Therefore, when the engine speed is high and the mixture gas having the high fuel concentration needs to be formed in the center portion of the combustion chamber 6 (the fuel concentration of the mixture gas in the center portion of the combustion chamber 6 needs to be increased), the effect of the swirl flow alone may be insufficient. In this regard, in this embodiment, at the high speed side in the low-load first segment A1_a, the center timing of the fuel injection is retarded while generating the swirl flow. Therefore, with the combination of the effect of the swirl flow with the effect of retarding the center timing of the fuel injection to prevent the fuel spray from diffusing to the entire combustion chamber 6 by CTDC, the mixture gas having the high fuel concentration is formed in the center portion of the combustion chamber 6 more reliably (the fuel concentration of the mixture gas in the center portion of the combustion chamber 6 is increased more).

In this embodiment, the ratio of the injection amount of the post injection Q3 in the low load-side first segment A1-a is set larger as the engine speed increases, and the injection start timing of the post injection Q3 (the timing when the post injection Q3 starts) is advanced as the engine speed increases.

Therefore, in the entire low-load first segment A1_a, stable SPCCI combustion is achieved by forming the mixture gas having the high fuel concentration in a part of the combustion chamber 6, while reducing the generation of soot.

For example, by increasing the ratio of the injection amount of the post injection Q3 on the high speed side, the mixture gas having the high fuel concentration is formed in a part of the combustion chamber 6 more reliably. However, soot is easily generated when the fuel concentration is excessively high. On the other hand, since the injection start timing of the post injection Q3 is advanced as the engine speed increases, when the engine speed is high, the fuel concentration is moderately increased.

On the other hand, when the engine speed is low, by reducing the ratio of the injection amount of the post injection Q3, the formation of mixture gas having an excessively high fuel concentration in a part of the combustion chamber 6 is prevented and the generation of soot is reduced.

Further, in this embodiment, in the low-speed first operating range A1, when the engine speed is low, the pre-injection Q1 is performed on the intake stroke, and when the engine speed is high, the pre-injection Q1 is performed on the compression stroke. Thus, the mixture gas having a suitable fuel concentration corresponding to the engine speed is formed.

Further, in this embodiment, in the high-load first segment A1_b, the fuel injection is dividedly performed a plurality of times and the injection start timing of the pre-injection Q1, which is the fuel injection performed firstly, is substantially fixed regardless of the engine speed. Thus, the mixture gas having the suitable fuel concentration corresponding to the engine speed is formed.

Further, in this embodiment, in the high-load first segment A1_b, the three injections (the pre-injection Q1, the middle injection Q2, the post injection Q3) are performed on the low speed side, while the post injection Q3 is stopped and the two injections (the pre-injection Q1 and the middle injection Q2) are performed on the high speed side. That is, in the high-load first segment A1_b, the number of times of fuel injections by the injector 15 is reduced as the engine speed increases.

Therefore, at the low speed side of the high-load first segment A1_b, the fuel is injected at a more suitable timing, and at the high speed side of the high-load side first segment A1_b, the formation of the mixture gas having excessively high fuel concentration is prevented and the mixture gas is suitably combusted.

For example, when the engine load is high, the amount of fuel injected into the combustion chamber 6 increases, and when the engine speed is high, a time length corresponding to one crank angle becomes short. Therefore, if the number of times of fuel injections is increased when the engine load is high and the engine speed is high, new fuel is added in a state where the precedingly injected fuel is not sufficiently vaporized and diffused, and the mixture gas having excessively high fuel concentration is formed. Therefore, in the high-load first segment A1_b, by reducing the number of times of fuel injections by the injector 15 as the engine speed increases, the formation of the mixture gas having excessively high fuel concentration at the high speed side is prevented.

Further, in this embodiment, within the first operating range A1, the control for performing the SPCCI combustion while forming the A/F lean environment in which A/F, which is the mass ratio of air to the fuel inside the combustion chamber 6, is larger than the stoichiometric air-fuel ratio, is executed. Therefore, within the first operating range A1, the SPCCI combustion is performed in an environment in which a heat capacity ratio of the mixture gas is large and which is advantageous for the thermal efficiency, and fuel efficiency of the engine is effectively improved.

That is, when the engine is assumed to be an Otto cycle engine, its theoretical thermal efficiency is determined based only on the compression ratio of the engine and the heat capacity ratio of the mixture gas, and it becomes large when either of the compression ratio and the heat capacity ratio is large. On the other hand, the heat capacity ratio is known to decrease as the number of atoms constituting a gas molecule within the mixture gas increases. For example, triatomic molecules such as $CO_2$ and $H_2O$, which are contained within EGR gas in large amounts, have a smaller heat capacity ratio than diatomic molecules such as $N_2$ and $O_2$, which are mainly contained within air (fresh air). From this, when the A/F lean environment is formed within the first operating range A1 and a larger amount of air than the air amount equivalent to the stoichiometric air-fuel ratio is introduced into the combustion chamber 6, the ratio of the diatomic molecule within the mixture gas may be increased to raise the heat capacity ratio, and thus the thermal efficiency improves.

Further, in this embodiment, during the operation within the first operating range A1, in the state where the opening of the swirl valve 18 is reduced to a relatively low opening (about 20 to 40%), that is, in a state where a relatively strong swirl flow is formed inside the combustion chamber 6, the fuel is radially injected at a suitable timing (the timing when the spray of the fuel reaches the swirl flow) from the multi-hole injector 15 located at the center portion of the ceiling surface of the combustion chamber 6, and thus the stratified mixture gas in which the fuel concentration is higher in the center portion of the combustion chamber 6 than in the outer circumferential portion is formed (see FIGS. 15 and 11). With this configuration, a flame core is reliably formed by the spark ignition using the spark plug 16 within relatively rich mixture gas formed in the center portion of the combustion chamber 6, and the SI combustion and the subsequent CI combustion are stabilized.

Especially in this embodiment, the inclined swirl flow which flows nonparallel to a plane perpendicular to the cylinder axis Z is formed as the swirl flow, and the position and orientation of each nozzle port of the injector 15 are set so that the fuel portion which reaches the swirl flow first (e.g., the fuel portion f1) moves downstream along the swirl flow and then joins with another fuel portion which reaches the swirl flow later (e.g., the fuel portion f2). Thus, the (relatively rich) mixture gas at a high fuel concentration is reliably formed in the center portion of the combustion chamber 6 which is the final destination of the swirl flow, and therefore, the stratification of the mixture gas described above is further stimulated.

Further, in this embodiment, when the SPCCI combustion is performed (during the operation within the first and second operating ranges A1 and A2), the ignition timing by the spark plug 16 is adjusted so that θci which is the start timing of the CI combustion matches with a given target θci for each operating condition of the engine, in other words, so that the SI ratio correlated with θci (the ratio of the heat generation amount by the SI combustion with respect to the total heat generation amount) matches with the target SI ratio. Therefore, the ratio of the CI combustion is increased (i.e., the SI ratio is reduced) as much as possible within the range that the combustion noise does not become excessive, and the thermal efficiency by the SPCCI combustion is improved as much as possible.

(9) Modifications

In this embodiment, the case where the three injections are performed in the low-load first segment A1_a is described; however, the number of injections in the low-load first segment A1_a is not limited to this.

For example, the fuel may be injected only once in the low-load first segment A1_a. Also in this case, in the low-load first segment A1_a, the timing when the fuel is injected is retarded as the engine speed increases. In the case of performing the fuel injection only once, by setting the fuel injection start timing on the retarding side, the center timing of the fuel injection, that is, the timing when the fuel is injected, is set on the retarding side.

Moreover, the number of times injections are performed at the low speed side and the number of times injections are performed at the high speed side of the high-load first segment A1_b are not limited to those described above (three and two times). For example, also at the high-speed side of the high-load first segment A1_b, injections may be performed the same number of times as at the low speed side (e.g., three times). However, as described above, by reducing the number of times injections are performed at the high speed side of the high-load first segment A1_b to be smaller than that at the low speed side, while forming suitable mixture gas at the low speed side, the formation of the mixture gas having excessively high fuel concentration at the high speed side is prevented.

Further, for each of the low speed side and high speed side of the low-load first segment A1_a and the low speed side and high speed side of the high-load first segment A1_b, the specific injection start timings and the ratios of the injection amount of the injections Q1, Q2, and Q3 are not limited to those described above.

Although in this embodiment, the booster 33 mechanically driven by the engine body 1 is provided in the intake passage 30, instead of such a mechanical booster 33 (supercharger), an electric booster driven by a motor, or a turbocharger driven by the energy of the exhaust gas may be provided.

Although in this embodiment, the cavity 20 having a donut shape in the plan view to surround the conical-shaped bulge portion 20a is formed in the crown surface of the piston 5, the concave portion of the cavity 20 facing the spark plug 16, that is, the concave portion located on the intake side of the bulge portion 20a, may be formed so as to be smaller than the concave portion on the opposite side (exhaust side). In this manner, when the fuel is injected from the injector 15 in the final stage of the compression stroke, fuel spray is moved to the vicinity of the electrode of the spark plug 16 more promptly.

Although in this embodiment, the intake and exhaust VVTs 13a and 14a are controlled to form the valve overlap period in which both the intake and exhaust valves 11 and 12 are opened over TDC of the exhaust stroke when performing the internal EGR in which the burned gas is left in the combustion chamber 6, conversely, the internal EGR may be performed by forming a so-called negative overlap period in which both the intake and exhaust valves 11 and 12 are closed over TDC of the exhaust stroke.

In this embodiment, the intake VVT 13a (exhaust VVT 14a) adopts the variable phase mechanism which simultaneously changes the open and close timings of the intake valve 11 (exhaust valve 12); however, the intake VVT 13a may be a variable mechanism of a type which only changes the open timing while fixing the close timing of the intake valve 11, and the exhaust VVT 14a may be a variable mechanism of a type which only changes the close timing while fixing the open timing of the exhaust valve 12.

In this embodiment, the swirl valve 18 is provided to one of the two intake ports 9A and 9B (the second intake port 9B) provided to one cylinder 2, and the opening of the swirl valve 18 is changed to adjust the strength of the swirl flow. However, the method of adjusting the strength of the swirl flow with a swirl mechanism is not limited to this. For example, the strength of the swirl flow may be adjusted by setting the lift amount of the intake valve 11 which opens and closes the first intake port 9A and the lift amount of the intake valve 11 which opens and closes the second intake port 9B different from each other or the operating timings of these two intake valves 11 different from each other. In this manner, the intake valves 11 may be considered the "swirl mechanism."

In this embodiment, for each operating condition (speed/load) of the engine, the optimal SI ratio (target SI ratio) and the corresponding start timing of the CI combustion (target θci) with which the combustion noise and the thermal efficiency have a well-balanced relationship are determined in advance, and during the SPCCI combustion, the ignition timing for achieving the target SI ratio and the target θci (the correction amount from the target value) is obtained using the model formula based on the in-cylinder state functions at the given timing before the ignition (EGR ratio, temperature, etc.); however, alternatively/additionally to the ignition timing, the fuel injection start timing from the injector 15 may be adjusted. Alternatively, both the fuel injection start timing and amount may be adjusted.

In this embodiment, during the SPCCI combustion, the start timing of the CI combustion (θci) is calculated based on the waveform of the in-cylinder pressure detected by the in-cylinder pressure sensor SN2, and based on the calculated θci, the model formula is modified to correct the ignition timing; however, alternatively/additionally to θci, the SI ratio which is the ratio of the SI combustion may be calculated and the model formula may be corrected based on the SI ratio.

Note that when calculating the SI ratio of each combustion as described above, various specific methods can be considered to calculate this SI ratio.

For example, the heat generation rate at each crank angle timing may be calculated from the detected waveform by the in-cylinder pressure sensor SN2, and the areas R1 and R2 illustrated in FIG. 6 may be calculated based on the data (waveform) of the calculated heat generation rate. In this case, although the SI ratio may be calculated as SI ratio=R1/(R1+R2) as described above, alternatively, SI ratio=R1/R2 may be established.

Figure 18:
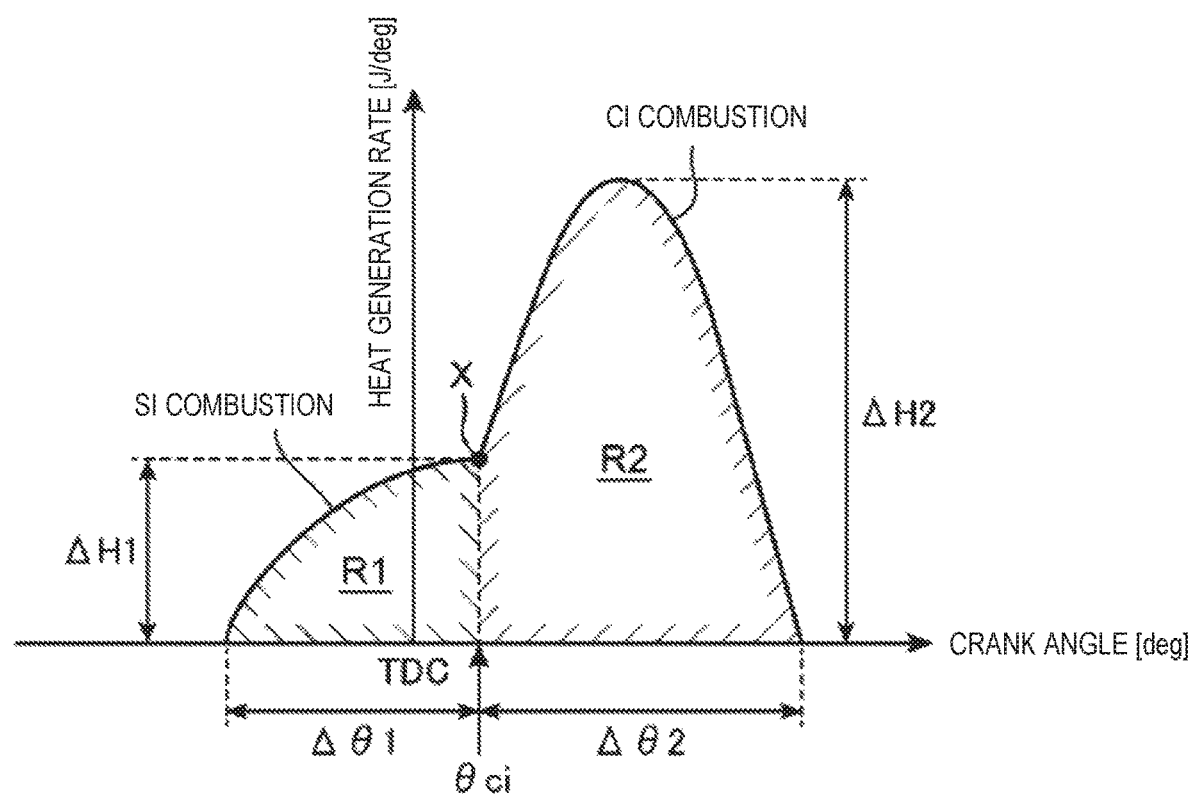
FIG. 18 is a chart corresponding to FIG. 6, illustrating various methods of defining an SI ratio.

Further, the SI ratio may be calculated using $\Delta\theta 1$ and $\Delta\theta 2$ illustrated in FIG. 18. That is, when the crank angle period of the SI combustion (the crank angle period on the advancing side of the flection point X) is $\Delta\theta 1$ and the crank angle period of the CI combustion (the crank angle period on the retarding side of the flection point X) is $\Delta\theta 2$, SI ratio=$\Delta\theta 1/(\Delta\theta 1+\Delta\theta 2)$ or SI ratio=$\Delta\theta 1/\Delta\theta 2$ may be established.

Furthermore, when a peak of the heat generation rate of the SI combustion is $\Delta H1$ and a peak of the heat generation rate of the CI combustion is $\Delta H2$, SI ratio=$\Delta H1/(\Delta H1+\Delta H2)$ or SI ratio=$\Delta H1/\Delta H2$ may be established.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
6 Combustion Chamber
15 Injector
16 Spark Plug
18 Swirl Valve
40 Exhaust Passage
100 ECU (Controller)

What is claimed is:

1. A control system for a compression-ignition engine, comprising:
   an engine having a combustion chamber formed by a cylinder, a piston and a cylinder head;
   an injector attached to the engine and configured to supply fuel into the combustion chamber;
   a spark plug disposed to be oriented into the combustion chamber;
   a swirl valve provided to an intake passage of the engine; and
   a controller connected to the injector, the spark plug, and the swirl valve, and configured to output a control signal to the injector, the spark plug, and the swirl valve, respectively, the controller including a processor configured to execute:
      a swirl adjusting module to adjust an opening of the swirl valve to generate a swirl flow inside the combustion chamber;
      a fuel injection timing controlling module to control a timing of the fuel injection by the injector, the fuel injection timing controlling module outputting a control instruction to the injector to retard the fuel injection timing as an engine speed increases; and
      a combustion controlling module to output an ignition instruction to the spark plug so as to ignite at a given ignition timing after the swirl generation by the swirl adjusting module and the fuel injection by the fuel injection timing controlling module, so that partial compression-ignition combustion in which a mixture gas combusts by flame propagation and then combusts by compression ignition is performed at the given ignition timing.

2. The control system of claim 1, wherein during the partial compression-ignition combustion in which the swirl flow is generated and the fuel injection timing is retarded as the engine speed increases, the fuel injection timing controlling module causes the injector to perform a pre-injection in which a given amount of fuel is injected into the combustion chamber and a post-injection in which fuel is injected into the combustion chamber after the pre-injection and controls the injector to retard the start timing of the pre-injection as the engine speed increases.

3. The control system of claim 2, wherein during the partial compression-ignition combustion in which the swirl flow is generated and the fuel injection timing is retarded as the engine speed increases, the fuel injection timing controlling module controls the injector to increase a ratio of an injection amount of the post-injection to a total amount of fuel to be injected into the combustion chamber in one cycle as the engine speed increases and to advance the start timing of the post-injection as the engine speed increases.

4. The control system of claim 2, wherein during the partial compression-ignition combustion in which the swirl flow is generated and the fuel injection timing is retarded as the engine speed increases, the fuel injection timing controlling module controls the injector to perform the pre-injection on intake stroke when the engine speed is lower than a given value, and perform the pre-injection on compression stroke when the engine speed is higher than the given value.

5. The control system of claim 1, wherein the injector at least has a first nozzle port and a second nozzle port disposed at a center portion of a ceiling surface of the combustion chamber and separated from each other in a circumferential direction of the injector, the first and second nozzle ports simultaneously injecting the fuel,
   wherein the swirl flow is an inclined swirl flow flowing nonparallel to a plane perpendicular to a center axis of the combustion chamber, and
   wherein the first and second nozzle ports are positioned and oriented so that a first fuel portion injected by the first nozzle port that has reached the swirl flow moves downstream along the swirl flow and then joins with a second fuel portion injected by the second nozzle port that has reached the swirl flow.

6. The control system of claim 1, wherein during a partial compression-ignition combustion in an operating range with a higher load than that of an operating range where the partial compression-ignition combustion, in which the swirl flow is generated and the fuel injection timing is retarded as the engine speed increases, is performed, the swirl adjusting module causes the swirl valve to generate the swirl flow and the fuel injection timing controlling module controls the injector to inject the fuel dividedly a plurality of times and a start timing of a first injection of the plurality of times the divided fuel injections are performed is substantially fixed regardless of the engine speed.

7. The control system of claim 6, wherein during the partial compression-ignition combustion in the operating range with the higher load, the fuel injection timing controlling module reduces a number of the plurality of times the divided fuel injections are performed by the injector as the engine speed increases.

8. A control system for a compression-ignition engine comprising:
   an injector configured to supply fuel into a combustion chamber;
   a spark plug configured to ignite a mixture gas containing fuel supplied from the injector and air;
   a swirl mechanism configured to generate a swirl flow; and
   a controller connected to the injector and the spark plug, and configured to output a control signal to the injector and the spark plug, respectively, the controller including a processor configured to execute:
   a fuel injection timing controlling module to control a timing of the fuel injection by the injector, the fuel injection timing controlling module outputting a control instruction to the injector to retard the fuel injection timing as an engine speed increases; and
   a combustion controlling module to output an ignition instruction to the spark plug so as to ignite at a given ignition timing after the swirl generation by the swirl mechanism and the fuel injection by the fuel injection timing controlling module, so that partial compression-ignition combustion in which a mixture gas combusts by flame propagation and then combusts by compression ignition is performed at the given ignition timing.

* * * * *